(12) United States Patent
Yang et al.

(10) Patent No.: US 8,719,490 B2
(45) Date of Patent: May 6, 2014

(54) STORAGE ARRAY, STORAGE SYSTEM, AND DATA ACCESS METHOD

(71) Applicant: Huawei Technologies Co., Ltd., Guangdong (CN)

(72) Inventors: Jitao Yang, Shenzhen (CN); Wei-Tai Chou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/715,409

(22) Filed: Dec. 14, 2012

(65) Prior Publication Data

US 2013/0111117 A1    May 2, 2013

Related U.S. Application Data

(63) Continuation of application No. PCT/CN2011/084999, filed on Dec. 30, 2011.

(30) Foreign Application Priority Data

Dec. 30, 2010  (CN) .......................... 2010 1 0615960
Sep. 16, 2011  (CN) .......................... 2011 1 0276089

(51) Int. Cl.
*G06F 12/00*    (2006.01)
*G06F 13/00*    (2006.01)

(52) U.S. Cl.
USPC ............ 711/103; 711/100; 711/154; 711/200

(58) Field of Classification Search
USPC ................................. 711/100, 103, 154, 200
See application file for complete search history.

(56) References Cited

U.S. PATENT DOCUMENTS 5,729,705 A      3/1998   Weber
7,610,438 B2 *  10/2009   Lee et al. ..................... 711/103

(Continued)

FOREIGN PATENT DOCUMENTS

CN    1251446 A    4/2000
CN    1291747 A    2/2001

(Continued)

OTHER PUBLICATIONS

Written Opinion of the International Searching Authority in corresponding International Patent Application No. PCT/CN2011/084999 (Apr. 5, 2012).

(Continued)

*Primary Examiner* — Tuan Thai
(74) *Attorney, Agent, or Firm* — Leydig, Voit & Mayer, Ltd.

(57) ABSTRACT

A storage array, a storage system, and a data access method. A data access method of a storage device includes: transferring data input from a user interface chip to a non-volatile storage device through a peripheral component interconnect express (PCIE) link, where the user interface chip and the non-volatile storage device are connected to the PCIE link, and the non-volatile storage device includes a memory and a non-volatile storage medium; writing the data to the memory of the non-volatile storage device; and writing the data written in the memory of the non-volatile storage device to the non-volatile storage medium. The technical solutions provided by the embodiments of the present disclosure are advantageous for reducing occupation of PCIE links due to data access and improving system performance.

9 Claims, 13 Drawing Sheets

(56) References Cited

U.S. PATENT DOCUMENTS

| | | | |
|---|---|---|---|
| 8,176,284 B2 * | 5/2012 | Frost et al. | 711/165 |
| 8,443,136 B2 * | 5/2013 | Frost et al. | 711/103 |
| 8,452,912 B2 * | 5/2013 | Lee et al. | 711/103 |
| 2010/0274965 A1 | 10/2010 | Cleveland et al. | |

FOREIGN PATENT DOCUMENTS

| | | |
|---|---|---|
| CN | 2791752 Y | 6/2006 |
| CN | 102063274 A | 5/2011 |
| DE | 202008008467 | 11/2008 |
| EP | 0756235 A1 | 1/1997 |
| EP | 2261791 A2 | 12/2010 |
| KR | 20010057762 A | 7/2001 |

OTHER PUBLICATIONS

First Office Action in corresponding Chinese Patent Application No. 201010615960.0 (Jan. 31, 2012).

Second Office Action in corresponding Chinese Patent Application No. 201010615960.0 (Jul. 11, 2012).

International Search Report in corresponding PCT Patent Application No. PCT/CN2011/084999 (Apr. 5, 2012).

Extended European Search Report in corresponding European Patent Application No. 11852505.4 (Apr. 5, 2013).

* cited by examiner

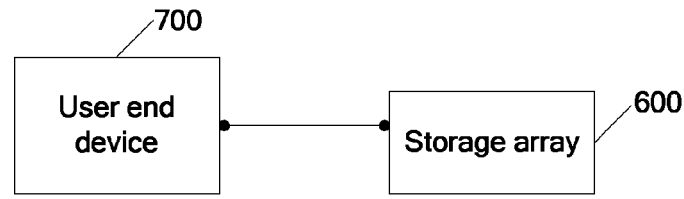
FIG. 7
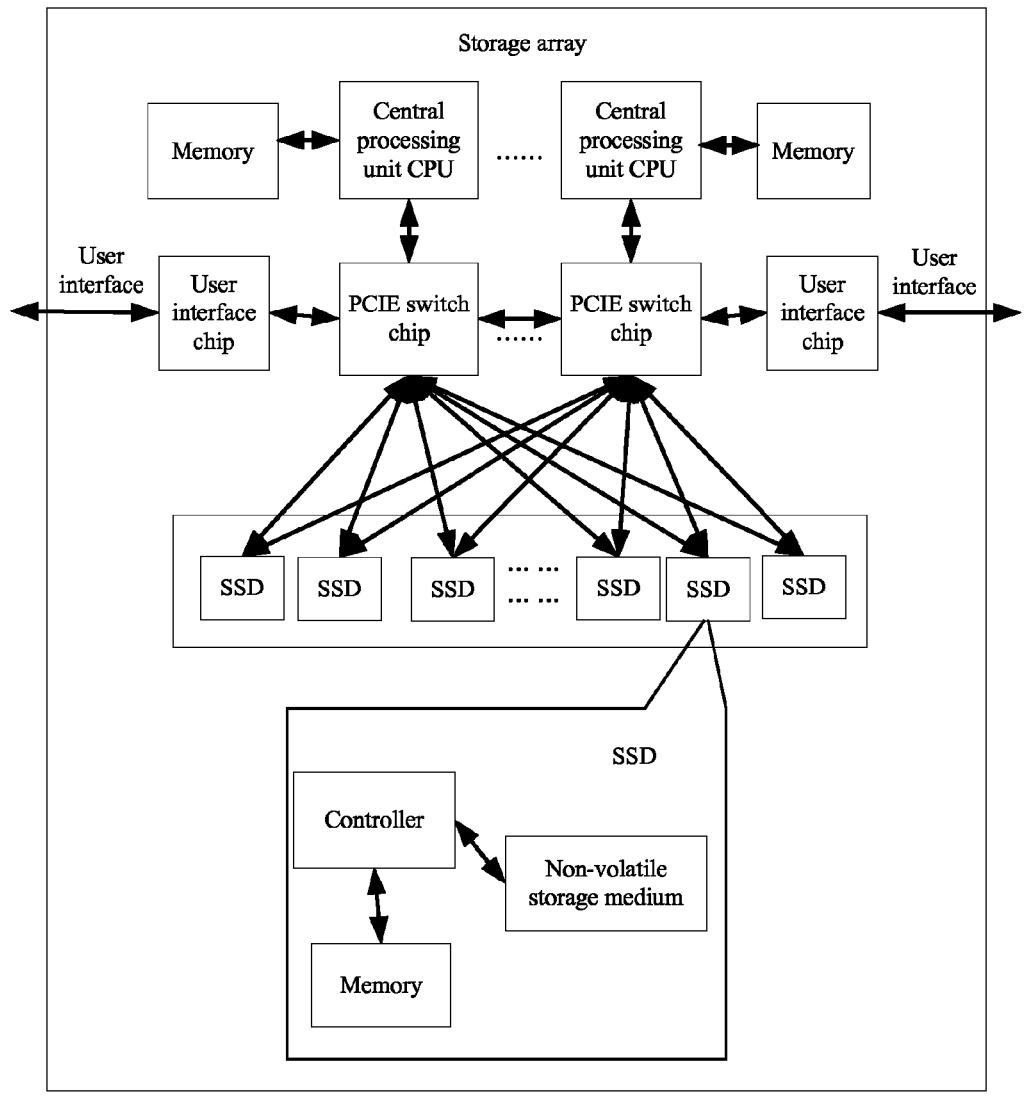
FIG. 8-a

FIG. 8-b

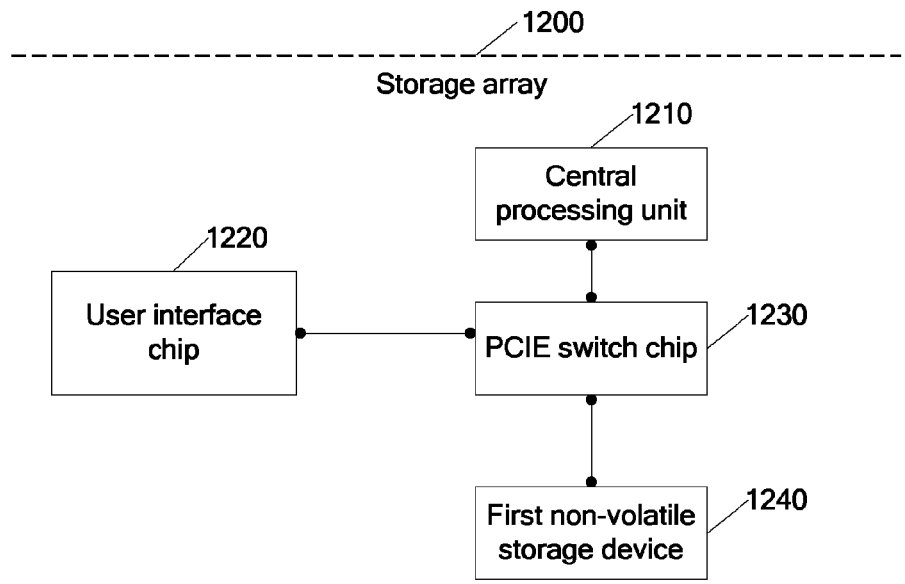
FIG. 12-a
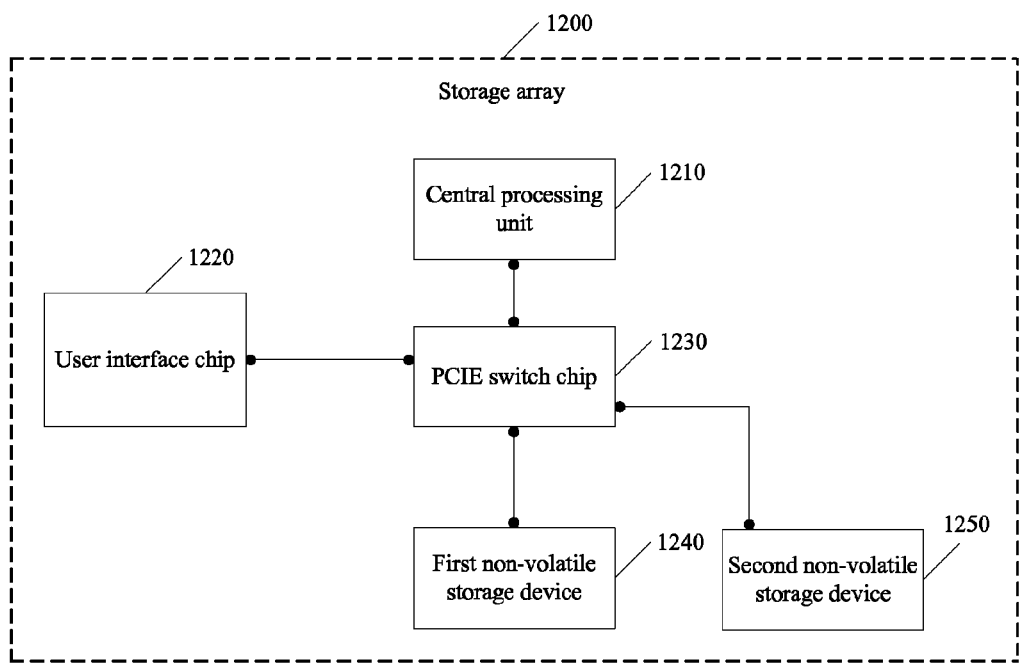
FIG. 12-b

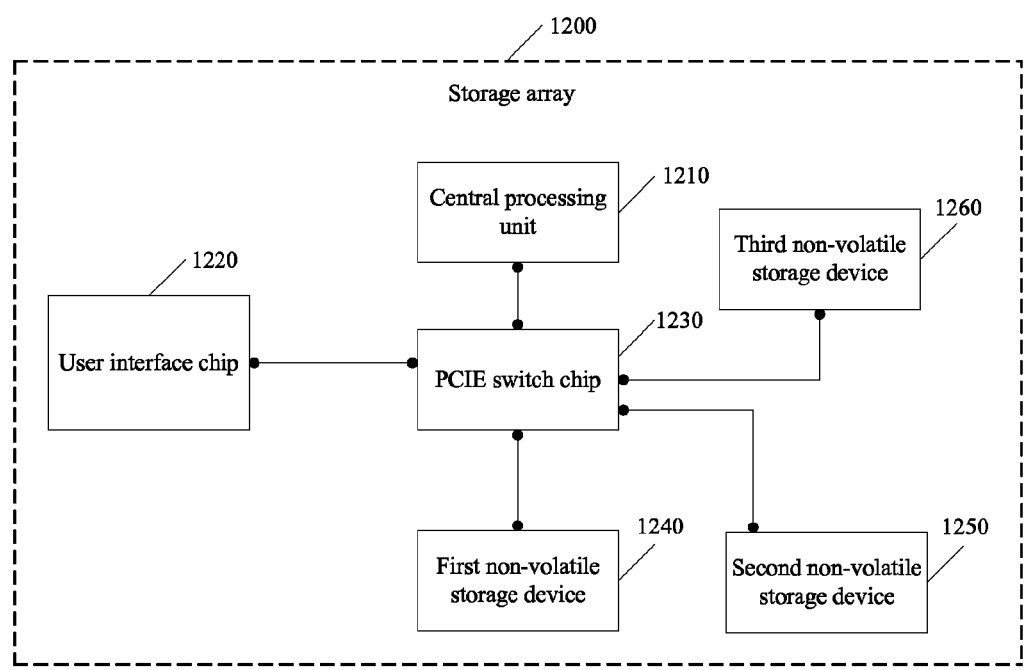
FIG. 12-c

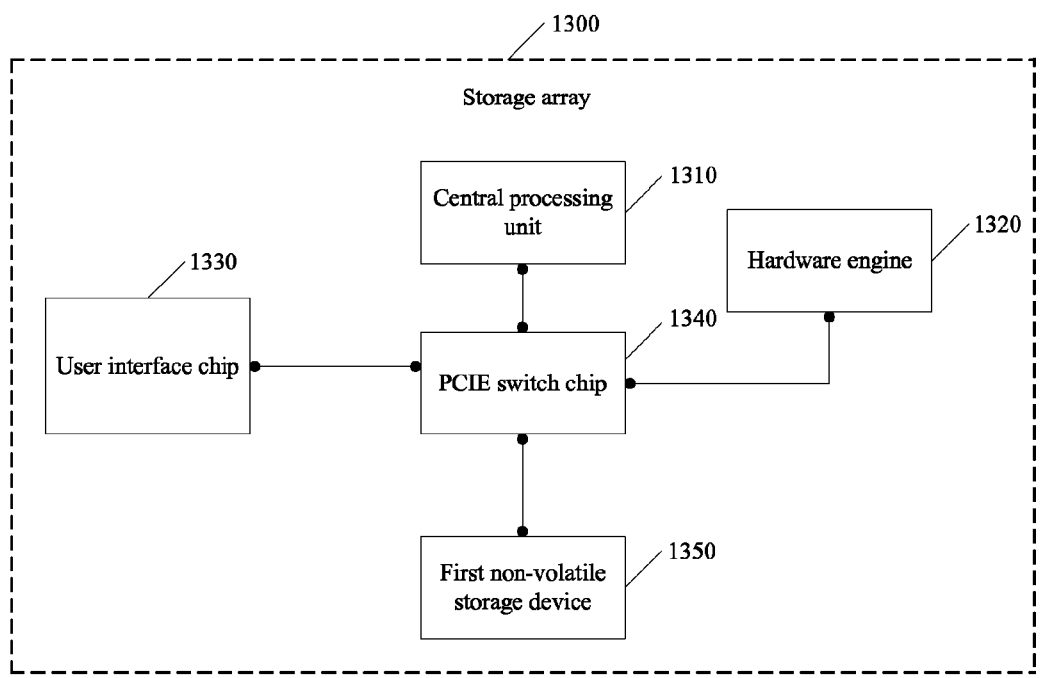
FIG. 13-a

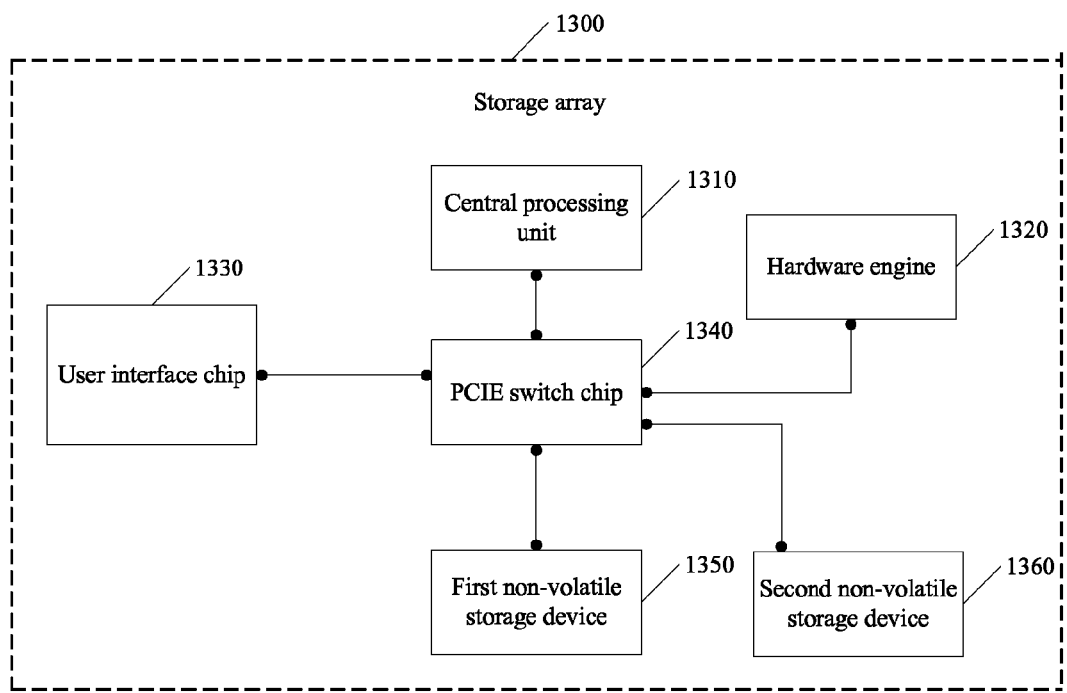
FIG. 13-b

STORAGE ARRAY, STORAGE SYSTEM, AND DATA ACCESS METHOD

CROSS-REFERENCE TO RELATED APPLICATIONS

This application is a continuation of International Patent Application PCT/CN2011/084999, filed on Dec. 30, 2011, which claims priority to Chinese Patent Application No. 201010615960.0, filed on Dec. 30, 2010, and Chinese Patent Application No. 201110276089.0, filed on Sep. 16, 2011, all of which are hereby incorporated by reference in their entireties.

FIELD

Embodiments of the invention relate to the field of computer technologies, and in particular, to a storage array, a storage system, and a data access method.

BACKGROUND

A conventional mechanical hard disk has mechanical parts and has a low input/output (IO) performance. An existing system-level device capable of providing a storage function mainly uses a mechanical hard disk as a storage medium, and the design method of the product (for example, a personal computer, a server, or a storage array) is based on the low 10 performance of the conventional hard disk.

In recent years, a solid state disk (SSD) has emerged, featuring almost no mechanical parts and a very high 10 performance. The performance of the system-level product designed by using the solid state disk may be further improved.

Referring to FIG. 1, a typical architecture of an existing storage array (for example, network-attached storage (NAS) and storage area network (SAN) devices) is an X86 architecture, and the system is connected to a user end (for example, a server) through a user interface chip. A Peripheral Component Interconnect Express (PCIE) bus switch chip interconnects peripheral components such as a user interface chip and a storage interface chip with a central processing unit (CPU).

In the process of writing data input by the user interface chip in the prior art, under the control of the CPU, the data is first written to a memory connected to the CPU/north bridge chip; the data is cached in the memory and is mirrored to another memory connected to the CPU/north bridge; then the data is written from the memory to a non-volatile storage medium under the control of the CPU. When data is written by using the existing manner, a lot of PCIE links are occupied, and the further improvement of the system performance is affected.

SUMMARY

Embodiments of the present invention provide a storage array, a storage system, and a data access method to reduce occupation of PCIE links due to data access and improve system performance.

To solve the preceding technical problem, the embodiments of the present invention provide the following technical solutions:

A data access method of a storage device includes:
receiving data input from a user interface chip through a peripheral component interconnect express PCIE link, by a non-volatile storage device, wherein the user interface chip and the non-volatile storage device are connected through the PCIE link, and the non-volatile storage device comprises a memory and a non-volatile storage medium;
writing the data to the memory of the non-volatile storage device; and
writing the data written in the memory of the non-volatile storage device to the non-volatile storage medium.

A storage array includes:
a central processing unit CPU, a user interface chip, a peripheral component interconnect express PCIE switch chip, and one or more non-volatile storage devices, where:
the PCIE switch chip connects the CPU, the user interface chip, and the non-volatile storage device to a PCIE link, where the non-volatile storage device includes a memory and a non-volatile storage medium;
the CPU is adapted to control transferring data input from the user interface chip to the non-volatile storage device through the PCIE link; and
the non-volatile storage device is adapted to write the data to the memory of the non-volatile storage device, and write the data written in the memory of the non-volatile storage device to the non-volatile storage medium.

As seen from above, the non-volatile storage device configured in the storage device in the embodiments of the present invention includes a memory and a non-volatile storage medium, and integrates the memory and non-volatile storage medium; the data input from the user interface chip is transferred to the non-volatile storage device directly through the PCIE link, and then is stored in the non-volatile storage medium of the non-volatile storage device, thereby implementing direct data transmission from the user interface chip to the non-volatile storage device without requiring forwarding via the memory controlled by the CPU; the data reading/writing mechanism occupies fewer PCIE links than the prior art, and is advantageous for improving performance of the storage system.

BRIEF DESCRIPTION OF THE DRAWINGS

To illustrate the technical solutions of the embodiments of the present invention and the prior art more clearly, accompanying drawings used in the description of the embodiments and the prior art are briefly described hereunder. Evidently, the accompanying drawings illustrate only some example embodiments of the present invention and persons of ordinary skill in the art may obtain other drawings based on these drawings without creative efforts.

FIG. 7 is a schematic diagram of a storage system according to an embodiment of the present invention;

FIG. 8-*b* is a schematic architecture diagram of another storage array according to an embodiment of the present invention;

FIG. 12-a is a schematic diagram of a storage array according to an embodiment of the present invention;

FIG. 12-b is a schematic diagram of another storage array according to an embodiment of the present invention;

FIG. 12-c is a schematic diagram of another storage array according to an embodiment of the present invention;

FIG. 13-a is a schematic diagram of another storage array according to an embodiment of the present invention;

FIG. 13-b is a schematic diagram of another storage array according to an embodiment of the present invention;

DETAILED DESCRIPTION OF THE EMBODIMENTS

Embodiments of the present invention provide a storage array, a storage system, and a data access method.

To make the solutions of embodiments of the invention more comprehensible for persons skilled in the art, the following clearly and completely describes the technical solutions according to the embodiments of the invention with reference to the accompanying drawings in the embodiments of the invention. Apparently, the embodiments in the following description are merely a part, rather than all, of the embodiments of the invention. All other embodiments obtained by persons of ordinary skill in the art based on the embodiments of the invention without creative efforts shall fall within the protection scope of embodiments of the invention.

Figure 1:
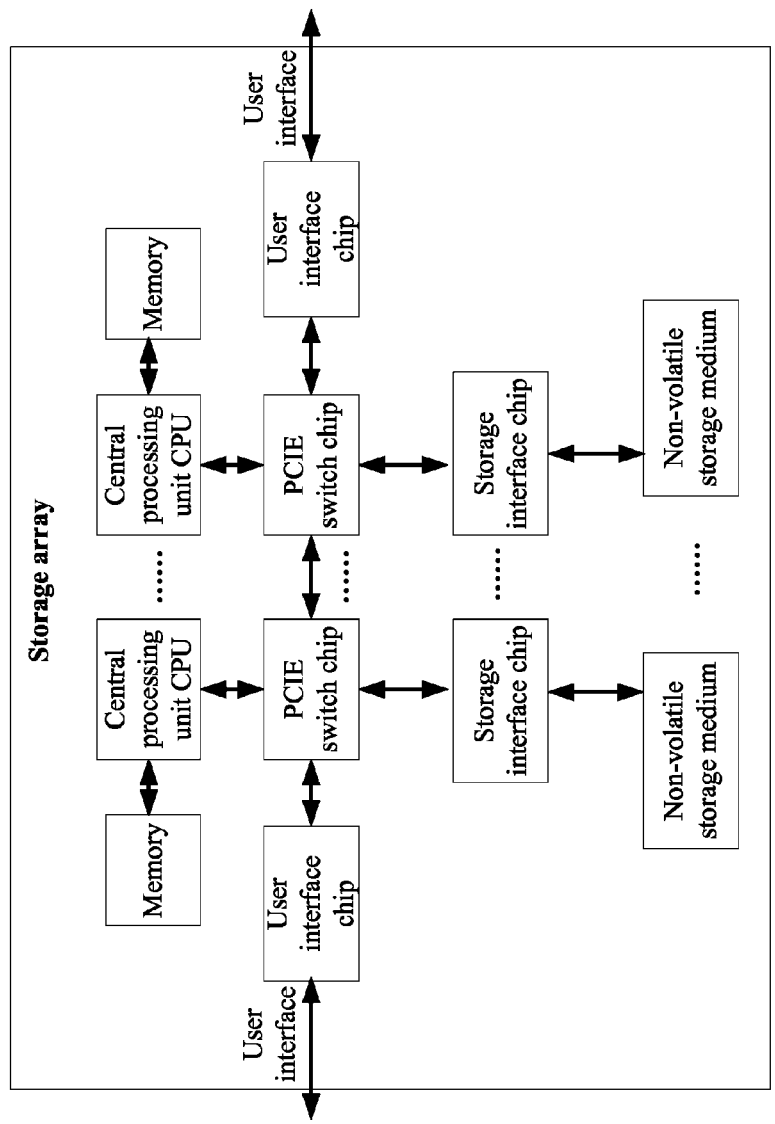
FIG. 1 is a schematic architecture diagram of a storage array in the prior art.
Figure 2:
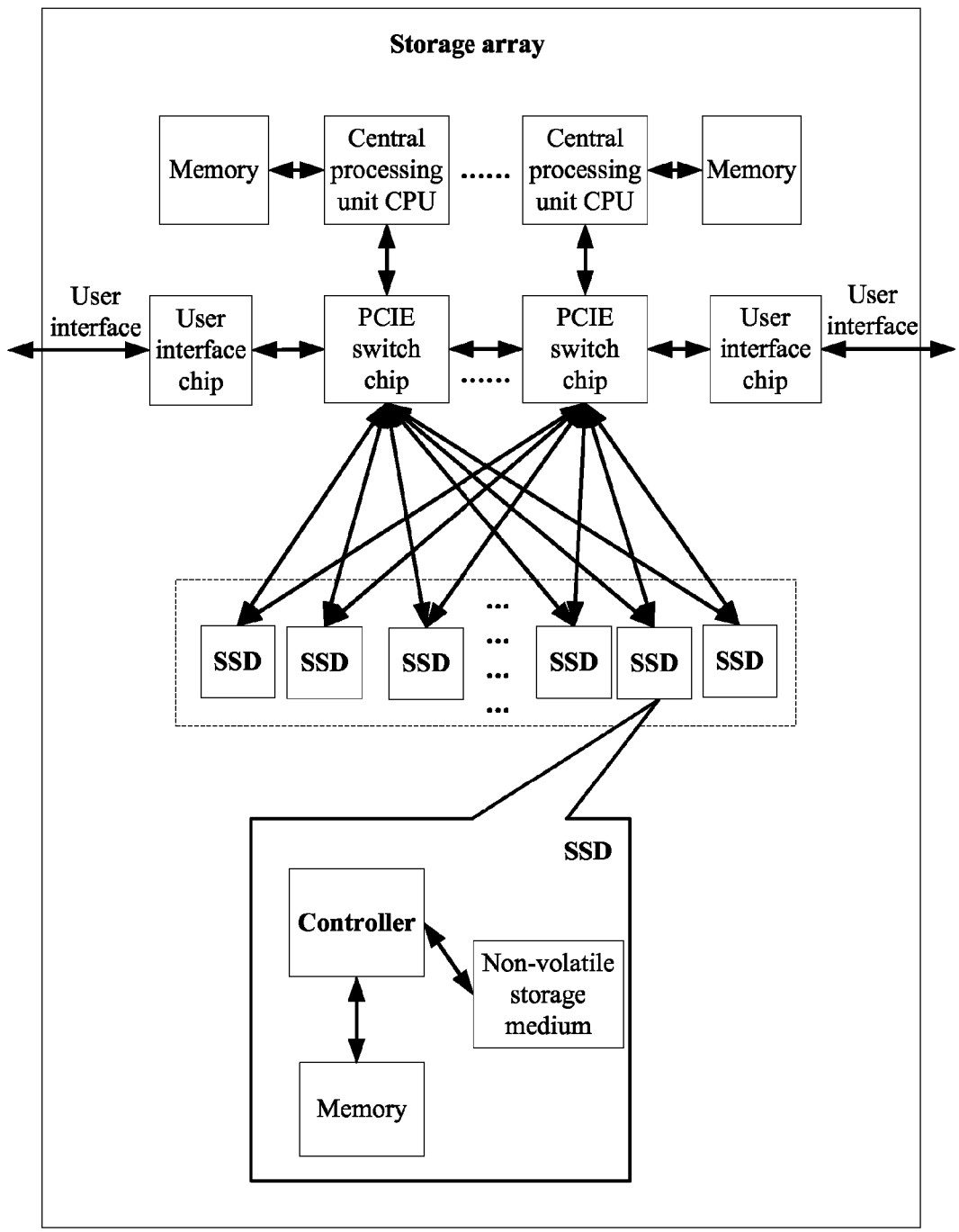
FIG. 2 is a schematic architecture diagram of a storage array according to an embodiment of the present invention.

For ease of understanding and implementation, the embodiments of the present invention first provide an architecture of a storage array. FIG. 2 is a schematic architecture diagram of a storage array used as an example according to an embodiment of the present invention. The storage array may include at least one CPU, multiple non-volatile storage devices (for example, an SSD, a mechanical hard disk, or other non-volatile storage devices, where the SSD is used as an example in FIG. 2), and at least one PCIE switch chip. The PCIE switch chip is configured with multiple PCIE interfaces, and can connect the CPU and peripheral components such as a user interface chip and a non-volatile storage device to a PCIE link. The non-volatile storage device may include a memory (for example, the memory may be a physical memory or a virtual memory) and a non-volatile storage medium, and further include a controller. The controller may control writing data from the memory of the non-volatile storage device to the non-volatile storage medium, reading data of the non-volatile storage medium to the memory of the non-volatile storage device, and so on.

The data access method in the embodiments of the present invention may be specifically implemented based on the storage array with the architecture shown in FIG. 2, and certainly may also be specifically implemented on any flexible architecture.

Embodiment 1

An embodiment of a data access method according to the present invention may include: transferring data input from a user interface chip to a non-volatile storage device through a peripheral component interconnect express PCIE link, where the user interface chip and the non-volatile storage device are connected through the PCIE link, and the non-volatile storage device includes a memory and a non-volatile storage medium; writing the data to the memory of the non-volatile storage device; and writing the data written in the memory of the non-volatile storage device to the non-volatile storage medium.

Figure 3:
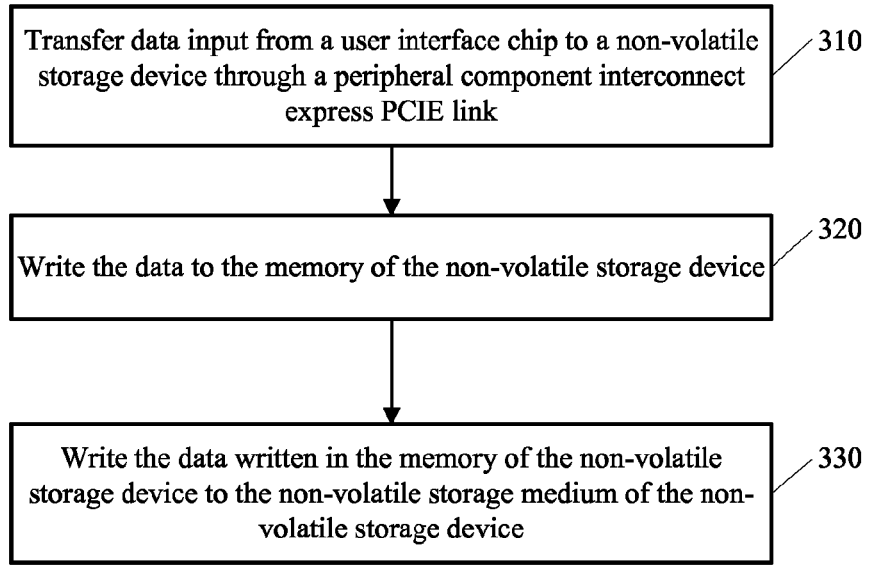
FIG. 3 is a schematic flowchart of a data access method according to a first embodiment of the present invention.

Referring to FIG. 3, the specific steps may include the following:

Step 310. Transfer data input from a user interface chip to a non-volatile storage device through a peripheral component interconnect express PCIE link.

In an application scenario, when a piece of data (referred to as first data for ease of citation) of a user terminal needs to be written to the storage device through a user interface chip of a storage device (for example, a storage array or a general storage device), the CPU may control transferring the first data input from the user interface chip to a non-volatile storage device (referred to as a first non-volatile storage device for ease of citation) of the storage device through the PCIE link.

The storage device is configured with one or more non-volatile storage devices (for example, an SSD, a mechanical hard disk, or non-volatile storage devices of other storage medium types); the non-volatile storage device includes a memory, a non-volatile storage medium, and so on; the user interface chip provides a user interface, mainly responsible for data interaction between the user terminal and the storage device.

The memory of the non-volatile storage device may be a high-performance non-volatile storage medium, such as, for example, a Double Data Rate (DDR) synchronous dynamic random access memory, a DDRII synchronous dynamic random access memory, or a DDRIII synchronous dynamic random access memory, or may also be a virtual memory. The non-volatile storage medium may include: a flash memory (flash), a ferroelectric storage medium, or any other storage medium.

In an actual application, if the user interface chip can directly access a block device, the CPU may control writing the first data input from the user interface chip to a logical block address (LBA) of the first non-volatile storage device through the PCIE link. If the user interface chip cannot directly access the block device but can access a memory device, when the CPU initializes the accessed first non-volatile storage device, the CPU may allocate a segment of memory window address space to the first non-volatile storage device (for example, the size of the memory window address space may be equal to the size of the memory (such as 4 GB (gigabytes)) of the non-volatile storage device, or the size of the logical storage space (such as 400 GB) of the non-volatile storage device, or may be any other value); when the user interface chip inputs the first data, the CPU may control writing the first data input from the user interface chip to a PCIE bus memory window address of the first non-volatile storage device through the PCIE link.

Step 320. Write the data to the memory of the non-volatile storage device.

The non-volatile storage device integrates a memory, which creates conditions for changing from centralized cache management to distributed cache management.

Step 330. Write the data written in the memory of the non-volatile storage device to the non-volatile storage medium of the non-volatile storage device.

In an application scenario, the non-volatile storage device may further include a controller. The controller may perform cache management for the memory of the non-volatile storage device, including: input/output aggregation (IO aggregation), data hit, data washout, and so on, where the specific cache management policy may be set according to a specific condition and is not limited herein. If the first non-volatile storage device is a storage device that is allocated with PCIE bus memory window address space, the CPU may notify the mapping between the PCIE bus memory window address and the logical storage space address of the first non-volatile storage device to the first non-volatile storage device through control signaling. In some embodiments, if the mapping between the PCIE bus memory window address and the logical storage space address of the non-volatile storage device is a default mapping agreed upon by the CPU and the first non-volatile storage device in advance, the CPU may not notify the mapping between the PCIE bus memory window address and the logical storage space address of the first non-volatile storage device to the first non-volatile storage device. The controller of the first non-volatile storage device may write the first data to the memory of the non-volatile storage device; based on the preset cache management policy (for example, the cache management policy may include: when the remaining space of the memory of the non-volatile storage device is lower than a threshold, writing the data written in the memory to the non-volatile storage medium; or immediately writing the data written in the memory to the non-volatile storage medium; certainly, other cache management policies may also be included), and according to the mapping between the PCIE bus memory window address and the logical storage space address of the first non-volatile storage device and the mapping between the logical storage space address and the physical storage space address of the first non-volatile storage device, the controller may control writing the first data written in the memory of the first non-volatile storage device to the non-volatile storage medium of the first non-volatile storage device. In addition, if the CPU performs uniform addressing for the memory space of the first non-volatile storage device, then the CPU may also control writing the first data to the memory of the non-volatile storage device, and based on the preset cache management policy, writing the first data written in the memory of the non-volatile storage device to the non-volatile storage medium of the non-volatile storage device.

In one implementation, when the controller of the first non-volatile storage device writes the first data to the memory of the first non-volatile storage device, the controller may first judge whether the memory of the non-volatile storage device has cached data (referred to as second data for ease of description) the same as the first data, and if not, write the first data to the memory of the non-volatile storage device, or if so, use the second data as the first data written to the memory of the non-volatile storage device (that is, in this case, the controller does not control writing the first data to the memory of the non-volatile storage device, but uses the second data as the first data written to the memory of the non-volatile storage device).

It may be found that in the above solutions of this embodiment, the PCIE link needs to be occupied only once in the process of writing a piece of data, thereby effectively reducing occupation of bus resources in the data writing process.

Further, if the data further needs to be read from the non-volatile storage device, the controller of the non-volatile storage device may further read the data stored in the non-volatile storage medium of the non-volatile storage device to the memory of the non-volatile storage device; and transfer, through the PCIE link, the data read from the memory of the non-volatile storage device to the user interface chip; or transfer, through the PCIE link, the data read from the memory of the non-volatile storage device to the CPU for processing.

In some embodiments, in the data reading/writing process of the storage device, different modules of the storage device may convert the encapsulation format of the data. For example, the user interface chip may convert the encapsulation format of the data from the user terminal into the format of a PCIE packet, and convert the format of the data to be sent to the user terminal into the encapsulation format corresponding to the user terminal; the non-volatile storage device may remove the packet header of the PCIE packet from the user interface chip or other modules and caches the PCIE packet into the memory and writes the PCIE packet to the non-volatile storage medium; the non-volatile storage device may also encapsulate the data that is read from the memory and needs to be sent to the user interface chip or other modules into a PCIE packet and send the PCIE packet; certainly, in different application scenarios, the encapsulation formats corresponding to the data are different, and details are omitted herein.

As seen from the above, the non-volatile storage device configured in the storage device in this embodiment includes a memory and a non-volatile storage medium, and integrates the memory and non-volatile storage medium; the data input from the user interface chip is transferred to the non-volatile storage device directly through the PCIE link, and then is stored in the non-volatile storage medium of the non-volatile storage device, thereby implementing direct data transmission from the user interface chip to the SSD without requiring forwarding via the memory controlled by the CPU; the data reading/writing mechanism occupies fewer PCIE links than that in the prior art, and is advantageous for improving performance of the storage system.

Further, because a memory is configured for the non-volatile storage device, if the storage device is configured with multiple non-volatile storage devices, the number of memory channels provided by the storage device may be several times greater than the number of memory channels provided in the prior art, a larger memory interface bandwidth is provided, and the performance of the storage system is further improved.

Embodiment 2

For better understanding the technical solutions of the embodiment of the present invention, the following describes in detail a specific application scenario of data access in the storage array architecture shown in FIG. 2.

This embodiment is described by using an example where the non-volatile storage device included in the storage array is a solid state disk, and the workflow using other types of non-volatile storage devices is similar.

Figure 4:
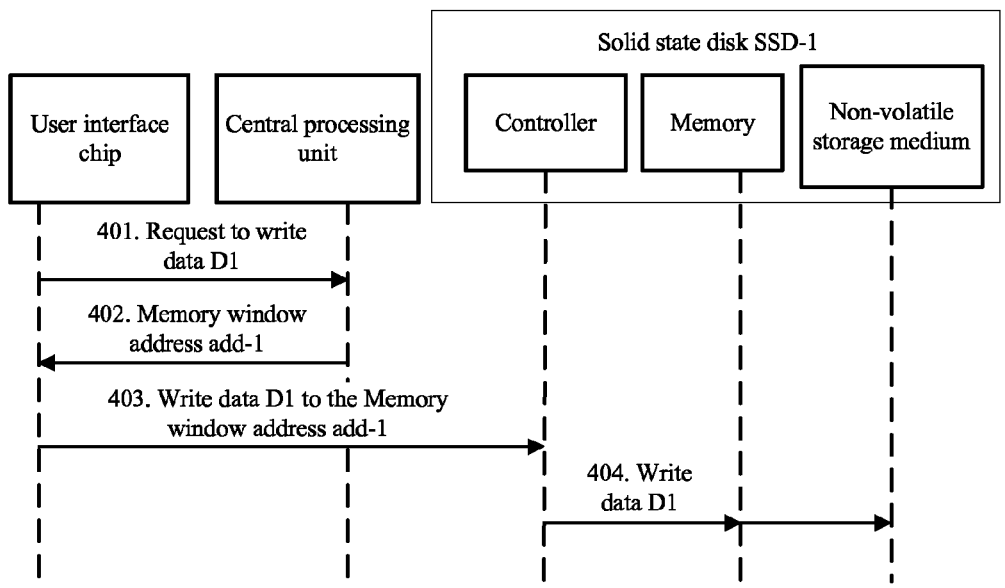
FIG. 4 is a schematic flowchart of a data access method according to a second embodiment of the present invention.

Referring to FIG. 4, an embodiment of a data access method according to the present invention may include the following:

Step 401. A user interface chip requests a CPU through an instruction to write a piece of data (referred to as data "D1" for ease of citation) from a user terminal.

Step 402. The CPU allocates a PCIE bus memory window address (referred to as a PCIE bus memory window address "add-1" for ease of citation) of a solid state disk (referred to as a solid state disk "SSD-1" for ease of citation) for the user interface chip to write data D1.

For example, the storage array shown in FIG. 2 may include at least one PCIE switch chip. The PCIE switch chip is configured with multiple PCIE interfaces. The CPU and peripheral components such as the user interface chip and solid state disk are connected to the PCIE bus link through the PCIE switch chip.

The solid state disk in this embodiment may be configured with at least two PCIE interfaces to respectively connect to PCIE interfaces of different PCIE switch chips. Because the solid state disk is connected to the PCIE switch chips through multiple PCIE links, it can avoid the problem that the solid state disk fails to work due to single-point failure.

In one implementation, when the CPU initializes the accessed solid state disk SSD-1, the CPU may scan the configuration space of the solid state disk, allocate PCIE bus memory window address space of a corresponding size to the solid state disk according to the scanned requested size of PCIE bus memory window address space recorded in the configuration space, and allocate a segment of PCIE bus memory window address space to the solid state disk SSD-1 (for example, the size of the Memory window may be equal to the size of the memory (such as 4 GB) of the solid state disk, or the size of the logical storage space (such as 400 GB) of the solid state disk, or certainly may be any other value); when the user interface chip requests to write the data D1, the CPU may allocate the PCIE bus memory window address add-1 corresponding to the solid state disk SSD-1 for the user interface chip to write the data D1.

Step 403. The user interface chip writes the data D1 to the PCIE bus memory window address add-1 of the solid state disk SSD-1 through the PCIE link.

Step 404. The controller of the solid state disk SSD-1 writes the data D1 to the memory of the solid state disk SSD-1, and writes the data written in the memory of the solid state disk SSD-1 to the non-volatile storage medium of the solid state disk SSD-1.

In the actual application, the controller of the solid state disk SSD-1 may perform cache management for the memory of the solid state disk SSD-1, including: input/output aggregation (IO aggregation), data hit, data washout, and so on, where the specific cache management policy may be set according to a specific condition and is not limited herein.

For example, if the memory of the solid state disk SSD-1 has sufficient remaining space, the controller of the solid state disk SSD-1 may write the data D1 to the memory of the solid state disk SSD-1; certainly, if the memory is insufficient, the controller of the solid state disk SSD-1 may first wash out unnecessary data in the memory (for example, the unnecessary data may be the data that is not accessed for a long time), and then write the data D1 to the memory of the solid state disk SSD-1, which may be regarded as distributed cache management performed by the solid state disk SSD-1, that is, the cache management function of the CPU is distributed to reduce the workload of the CPU.

Figure 5:
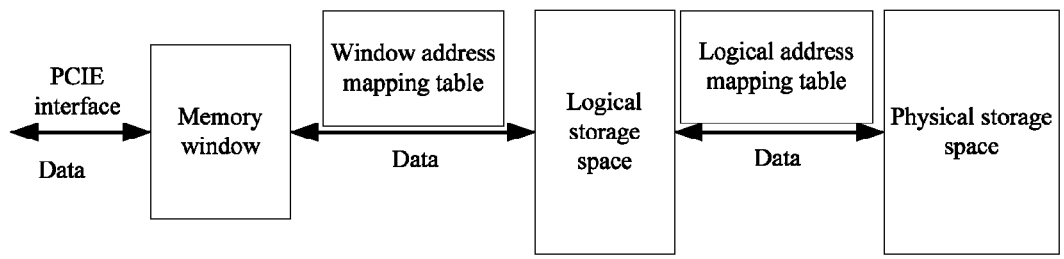
FIG. 5 is a schematic flowchart of a data writing process according to the second embodiment of the present invention.

In one implementation, the CPU may notify the mapping (for example, a certain mapping exists between the PCIE bus memory window address and the logical storage space address of the corresponding solid state disk, and the mapping may be recorded by a window address mapping table) between the PCIE bus memory window address add-1 and the logical storage space address of the solid state disk SSD-1 to the solid state disk SSD-1. If the mapping between the PCIE bus memory window address and the logical storage space address of the solid state disk is a default mapping agreed upon by the CPU and the solid state disk in advance, the CPU may not notify the mapping between the PCIE bus memory window address add-1 and the logical storage space address of the first solid state disk SSD-1 to the solid state disk. The controller of the solid state disk SSD-1 may write the data D1 to the memory of the solid state disk, and control, according to the mapping between the PCIE bus memory window address add-1 and the logical storage space address of the solid state disk SSD-1 and the mapping between the logical storage space address and the physical storage space address of the solid state disk SSD-1 (the mapping between the logical storage space and the physical storage space of the solid state disk is recorded in the logical address mapping table maintained by the solid state disk), writing the data D1 written in the memory of the solid state disk SSD-1 to the non-volatile storage medium of the solid state disk SSD-1, as shown in FIG. 5, which is a schematic flowchart of data writing, according to one embodiment.

In one implementation, the controller of the solid state disk SSD-1 may first judge whether the memory of the solid state disk SSD-1 has data the same as the data D1, and if not, write the data D1 to the memory of the solid state disk SSD-1, or if so, directly use the written data the same as the data D1 as the data D1 and write it to the non-volatile storage medium of the solid state disk SSD-1, without performing the operation of writing the data D1 to the memory and then to the non-volatile storage medium. This may also be regarded as distributed cache management performed by the solid state disk SSD-1, that is, the cache management function of the CPU is distributed to reduce the workload of the CPU.

It may be found that in the solutions of this embodiment, the PCIE link needs to be occupied only once in the process of writing the data D1, thereby effectively reducing occupation of bus resources in the data writing process.

Further, if it is further required to read the data D1 from the solid state disk SSD-1, then the controller of the solid state disk SSD-1 may read the data D1 stored in the non-volatile storage medium of the solid state disk SSD-1 to the memory of the solid state disk SSD-1; and transfer, through the PCIE link, the data D1 read from the memory of the solid state disk SSD-1 to the user interface chip (if the user interface chip requests to read the data D1); or transfer, through the PCIE link, the data read from the memory of the solid state disk to the CPU for processing (if the CPU needs to read the data D1 for processing).

As seen from the above, the solid state disk configured in the storage device in this embodiment includes a memory and a non-volatile storage medium, and integrates the memory and non-volatile storage medium (including: a flash memory, a ferroelectric storage medium, or any other storage medium); the data input from the user interface chip is transferred to the solid state disk directly through the PCIE link, and then is stored in the non-volatile storage medium of the solid state disk, thereby implementing direct data transmission from the user interface chip to the SSD without requiring forwarding via the memory controlled by the CPU; the data access mechanism occupies fewer PCIE links than that in the prior art, and is advantageous for improving performance of the storage system.

Further, because a memory is configured for the solid state disk, if the storage device is configured with multiple solid state disks, the number of memory channels provided by the storage device may be several times greater than the number of memory channels provided in the prior art, a larger memory interface bandwidth is provided, and the performance of the storage system is further improved.

Part or all of cache management functions (including: data reading/writing control, IO aggregation, data hit, data washout, and so on) change from centralized management of the CPU to distributed management of each solid state disk, which may relatively reduce the processing load of the CPU and further improve the performance of the storage system. In addition, the storage array using the architecture of this embodiment is advantageous for reducing the volume and power consumption of the storage array.

To better implement the technical solutions of the above embodiment, an embodiment of the present invention provides a device for implementing the above technical solutions.

Figure 6:
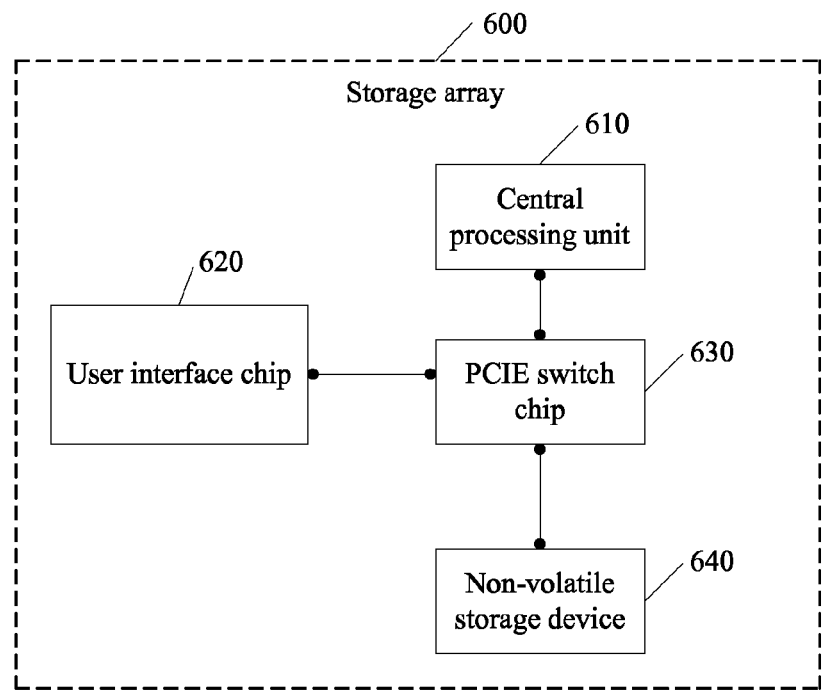
FIG. 6 is a schematic diagram of a storage array according to an embodiment of the present invention.

Referring to FIG. 6, a storage array 600 provided in an embodiment of the present invention may include a central processing unit 610, a user interface chip 620, a PCIE switch chip 630, and one or more non-volatile storage devices 640.

The PCIE switch chip 630 connects the central processing unit 610, user interface chip 620, and non-volatile storage device 640 to a PCIE link, where the non-volatile storage device 640 includes a memory and a non-volatile storage medium.

The central processing unit 610 is adapted to transfer data input from the user interface chip 620 to the non-volatile storage device 640 through the PCIE link.

The non-volatile storage device 640 is adapted to write the data to the memory of the non-volatile storage device 640, and write the data written in the memory to the non-volatile storage medium of the non-volatile storage device 640.

In one example of an application scenario, if the non-volatile storage device is a storage device that is allocated with PCIE bus memory window address space, the central processing unit 610 may be specifically adapted to control writing, through the PCIE link, the data input from the user interface chip 620 to the PCIE bus memory window address of the non-volatile storage device 640.

In one example application scenario, the central processing unit 610 is further adapted to notify a mapping between the PCIE bus memory window address and the logical storage space address of the non-volatile storage device to the non-volatile storage device 640 through control signaling.

The non-volatile storage device 640 further includes a controller. The controller is adapted to write the above data to the memory of the non-volatile storage device 640; and according to the mapping between the PCIE bus memory window address and the logical storage space address of the non-volatile storage device 640 and the mapping between the logical storage space address and the physical storage space address of the non-volatile storage device 640, correspondingly write the data written in the memory of the non-volatile storage device 640 to the non-volatile storage medium of the non-volatile storage device 640. In addition, if the central processing unit 610 performs uniform addressing for the memory space of the non-volatile storage device 640, the central processing unit 610 may also control writing the data to the memory of the non-volatile storage device, and based on the preset cache management policy, writing the data written in the memory of the non-volatile storage device to the non-volatile storage medium of the non-volatile storage device.

If the memory of the non-volatile storage device 640 has sufficient remaining space, the controller of the non-volatile storage device 640 may write the data to the memory of the non-volatile storage device 640; certainly, if the memory is insufficient, the controller of the non-volatile storage device 640 may first wash out unnecessary data in the memory, and then write the data to be written to the memory of the non-volatile storage device 640, which may be regarded as distributed cache management performed by the controller of the non-volatile storage device 640, that is, the cache management function of the CPU is distributed to reduce the workload of the CPU.

In an actual application, the controller of the non-volatile storage device 640 may also first judge whether the memory of the non-volatile storage device 640 already has second data the same as the data to be written, and if so, directly write the written second data the same as the data to be written to the non-volatile storage medium of the non-volatile storage device 640, without performing the operation of writing the data to be written to the memory and then to the non-volatile storage medium. This may also be regarded as distributed cache management performed by the non-volatile storage device 640, that is, the cache management function of the CPU is distributed to reduce the workload of the CPU.

In one example application scenario, the non-volatile storage device 640 may be further adapted to read the data stored in the non-volatile storage medium of the non-volatile storage device 640 to the memory of the non-volatile storage device 640; and transfer, through the PCIE link, the data read from the memory of the non-volatile storage device 640 to the user interface chip; or transfer, through the PCIE link, the data read from the memory of the non-volatile storage device 640 to the central processing unit 610 for processing.

The non-volatile storage device 640 in this embodiment may be, for example, an SSD, a mechanical hard disk, or other non-volatile storage devices.

It is understandable that the storage array 600 in this embodiment may be a separate device and may also serve as a storage device of a device. For example, the storage array 600 may be applied in a storage system, a server, a workstation, and a personal computer.

It is understandable that the storage array 600 in this embodiment may be the storage array in the foregoing method embodiments, and can be used to implement all technical solutions of the method embodiments; the function of each functional module can be implemented according to the methods in the foregoing method embodiments; the specific implementation process is as disclosed in the related description of the foregoing embodiments and is not further described herein.

As seen from above, the non-volatile storage device configured in the storage array 600 in this embodiment includes a memory and a non-volatile storage medium, and integrates the memory and non-volatile storage medium; the data input from the user interface chip is transferred to the non-volatile storage device directly through the PCIE link, and then is stored in the non-volatile storage medium of the non-volatile storage device, thereby implementing direct data transmission from the user interface chip to the SSD without requiring forwarding via the memory controlled by the CPU; the data reading/writing mechanism occupies fewer PCIE links than that in the prior art, and is advantageous for improving performance of the storage system.

Referring to FIG. 7, an embodiment of the present invention further provides a storage system, including a storage array 600 and a user terminal 700 connected to a user interface chip of the storage array 600.

The user terminal 700 may be adapted to access the storage array 600 through the user interface chip of the storage array 600. For example, the user terminal 700 may write data to the storage array 600, and/or, read data from the storage array 600.

It should be noted that, for the foregoing method embodiments, for ease of description, the method is described through a series of step combinations. However, it should be understood by persons skilled in the art that, embodiments of the present invention are not limited by the sequence of the described steps, and some steps may be performed in other sequences or performed at the same time according to the present invention. It should be further understood by persons skilled in the art that the described embodiments are exemplary embodiments, and the involved actions and modules are not necessarily required by the embodiments of the invention.

In the above embodiments, the description of each embodiment has its emphasis, and some embodiments may not be detailed. Reference may be made to the relevant description of other embodiments.

To conclude, the non-volatile storage device configured in the storage device in the embodiment of the present invention includes a memory and a non-volatile storage medium, and integrates the memory and non-volatile storage medium; the data input from the user interface chip is transferred to the non-volatile storage device directly through the PCIE link, and then is stored in the non-volatile storage medium of the non-volatile storage device; the data writing mechanism occupies fewer PCIE links than that in the prior art, and is advantageous for improving performance of the storage system.

Further, because a memory is configured for the non-volatile storage device, if the storage device is configured with multiple non-volatile storage devices, the number of memory channels provided by the storage device may be several times greater than the number of memory channels provided in the prior art, a larger memory interface bandwidth is provided, and the performance of the storage system is further improved.

Part or all of cache management functions (such as, for example, data reading/writing control, IO aggregation, data hit, and data washout) change from centralized management of the CPU to distributed management of each non-volatile storage device, which may relatively reduce the processing load of the CPU and further improve the performance of the storage system. In addition, the storage array using the architecture is advantageous for reducing the volume and power consumption of the storage array.

Embodiment 3

Another embodiment of the present invention provides a storage array, a storage system, and a data protection method to reduce occupation of PCIE links due to data access and improve system performance.

To solve the preceding technical problem, the embodiment of the present invention provides the following technical solutions:

A data protection method applicable to a storage device according to an embodiment of the present invention includes:

transferring data input from a user interface chip to a first non-volatile storage device through a peripheral component interconnect express PCIE link, where the user interface chip and the first non-volatile storage device are connected to the PCIE link, and the first non-volatile storage device includes a memory and a non-volatile storage medium;

writing the data to the memory of the first non-volatile storage device;

reading a group of data to be checked which includes the data;

performing a check operation for the group of data to be checked to obtain redundant data;

writing the data written in the memory of the first non-volatile storage device to the non-volatile storage medium of the first non-volatile storage device; and writing the redundant data to the non-volatile storage medium of the first non-volatile storage device or the non-volatile storage medium of a second non-volatile storage device through the PCIE link.

A data access method of a storage device according to an embodiment of the present invention includes:

transferring data input from a user interface chip respectively to a first non-volatile storage device and a second non-volatile storage device through a peripheral component interconnect express PCIE link, where the user interface chip and the non-volatile storage devices are connected to the PCIE link, and the first non-volatile storage device and the second non-volatile storage device respectively include a memory and a non-volatile storage medium;

writing the data to the memories of the first non-volatile storage device and second non-volatile storage device; and writing the data written in the memory of the non-volatile storage device to the non-volatile storage medium.

A storage array provided in an embodiment of the present invention includes:

a central processing unit CPU, a user interface chip, a peripheral component interconnect express PCIE switch chip, and a first non-volatile storage device, or the first non-volatile storage device and a second non-volatile storage device, where:

the PCIE switch chip connects the CPU, the user interface chip, and the first non-volatile storage device to a PCIE link, where the first non-volatile storage device includes a memory and a non-volatile storage medium;

the CPU is adapted to control transferring data input from the user interface chip to the first non-volatile storage device through the PCIE link;

the first non-volatile storage device is adapted to write the data to the memory of the first non-volatile storage device, and write the data written in the memory of the first non-volatile storage device to the non-volatile storage medium of the first non-volatile storage device; and the CPU is further adapted to read a group of data to be checked which includes the data; perform a check operation for the group of data to be checked to obtain redundant data; and control transferring the redundant data to the first non-volatile storage device or the second non-volatile storage device through the PCIE link.

A storage array provided in an embodiment of the present invention includes:

a central processing unit CPU, a hardware engine, a user interface chip, a peripheral component interconnect express PCIE switch chip, and a first non-volatile storage devices, where:

the PCIE switch chip connects the CPU, the hardware engine, the user interface chip, and the first non-volatile storage device to a PCIE link, where the first non-volatile storage device includes a memory and a non-volatile storage medium;

the CPU is adapted to control transferring data input from the user interface chip to the first non-volatile storage device through the PCIE link;

the first non-volatile storage device is adapted to write the data to the memory of the first non-volatile storage device, and write the data written in the memory of the first non-volatile storage device to the non-volatile storage medium of the first non-volatile storage device; and the hardware engine is adapted to read a group of data to be checked which includes the data; perform a check operation for the group of data to be checked to obtain redundant data; and control transferring the redundant data to the first non-volatile storage device or the second non-volatile storage device through the PCIE link.

A storage array provided by an embodiment of the present invention includes:

a central processing unit CPU, a user interface chip, a peripheral component interconnect express PCIE switch chip, a first non-volatile storage device, and a third non-volatile storage device, where:

the PCIE switch chip connects the CPU, user interface chip, first non-volatile storage device, and third non-volatile storage device to a PCIE link, where the first non-volatile storage device and third non-volatile storage device respectively include a memory and a non-volatile storage medium;

the CPU is adapted to control transferring data input from the user interface chip respectively to the first non-volatile storage device and the third non-volatile storage device through the PCIE link;

the first non-volatile storage device is adapted to write the data to the memory of the first non-volatile storage device, and write the data written in the memory of the first non-volatile storage device to the non-volatile storage medium of the first non-volatile storage device; and the third non-volatile storage device is adapted to write the data to the memory of the third non-volatile storage device.

A storage system provided in an embodiment of the present invention includes:

the storage array in the above embodiment and a user terminal connected to a user interface chip of the storage array, where the user terminal is adapted to access the storage array through the user interface chip.

As seen from the above, the non-volatile storage device configured in the storage device in embodiments of the present invention includes a memory and a non-volatile storage medium, and integrates the memory and non-volatile storage medium; the data input from the user interface chip is transferred to the non-volatile storage device directly through the PCIE link, and then is stored in the non-volatile storage medium of the non-volatile storage device, thereby implementing direct data transmission from the user interface chip to the non-volatile storage device without requiring forwarding via the memory controlled by the CPU; the data reading/writing mechanism occupies fewer PCIE links than that in the prior art, and is advantageous for improving performance of the storage system; in addition, the check based on the above architecture for the data input from the user interface chip is advantageous for improving data security.

Figure 8:
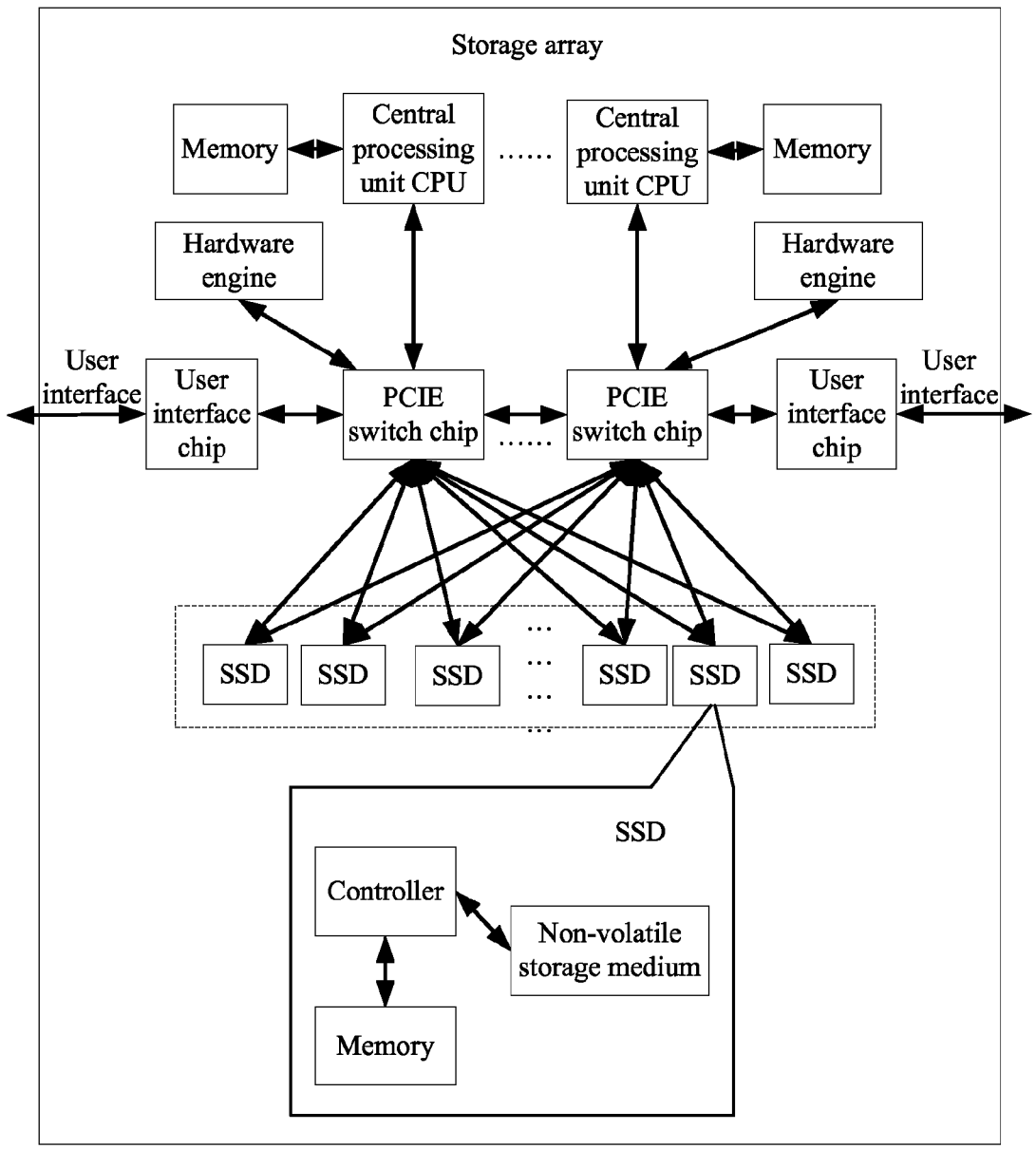
FIG. 8-*a* is a schematic architecture diagram of a storage array according to an embodiment of the present invention.

The data protection method in the embodiment of the present invention may be specifically implemented based on the storage array with the architecture shown in FIG. 8-$a$ or FIG. 8-$b$, and may also be specifically implemented on any flexible architecture.

An embodiment of a data protection method applicable to a storage device according to the present invention may include: transferring data input from a user interface chip to a first non-volatile storage device through a PCIE link, where the user interface chip and the first non-volatile storage device are connected to the PCIE link, and the first non-volatile storage device includes a memory and a non-volatile storage medium; writing the data to the memory of the first non-volatile storage device; reading a group of data to be checked which includes the data; performing a check operation for the group of data to be checked to obtain redundant data; writing the data written in the memory of the first non-volatile storage device to the non-volatile storage medium of the first non-volatile storage device; and writing the redundant data to the non-volatile storage medium of the first non-volatile storage device or the non-volatile storage medium of a second non-volatile storage device through the PCIE link.

Figure 9:
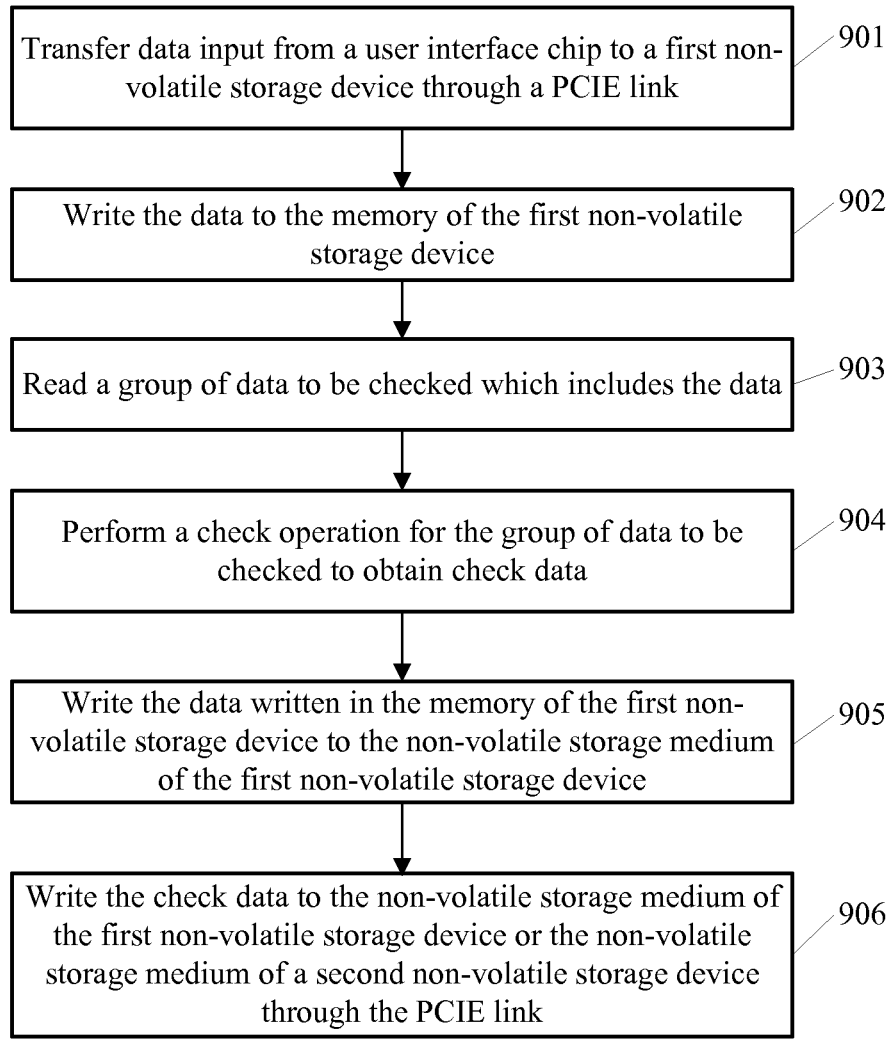
FIG. 9 is a schematic flowchart of a data protection method according to an embodiment of the present invention.

Referring to FIG. 9, the specific steps may include the following:

Step 901. Transfer data input from a user interface chip to a first non-volatile storage device through a PCIE link.

In one example application scenario, when a piece of data (referred to as first data for ease of citation) of a user terminal needs to be written through a user interface chip of a storage device (for example, a storage array or a general storage device) to the storage device, the CPU may control transferring the first data input from the user interface chip to a non-volatile storage device (referred to as a first non-volatile storage device for ease of citation) of the storage device through the PCIE link.

The storage device is configured with one or more non-volatile storage devices (for example, an SSD, or non-volatile storage devices of other storage medium types); the non-volatile storage device includes a memory, a non-volatile storage medium, and so on; the user interface chip provides a user interface, mainly responsible for data interaction between the user terminal and the storage device.

The memory of the non-volatile storage device may be a high-performance volatile storage medium such as a DDR (Double Data Rate) synchronous dynamic random access memory, a DDRII synchronous dynamic random access memory, or a DDRIII synchronous dynamic random access memory, or may also be a virtual memory. The non-volatile storage medium may include: a flash memory (flash), a ferroelectric storage medium, or any other storage medium.

In one example application, if the user interface chip can directly access a block device, the CPU may control writing the first data input from the user interface chip to a logical storage address (LBA) of the first non-volatile storage device through the PCIE link. If the user interface chip cannot directly access the Block device but can access a memory device, when the CPU initializes the accessed first non-volatile storage device, then the CPU may allocate a segment of memory window address space to the first non-volatile storage device (for example, the size of the memory window address space may be equal to the size of the memory (such as 4 GB) of the non-volatile storage device, or the size of the logical storage space (such as 400 GB) of the non-volatile storage device, or certainly may be any other value); when the user interface chip inputs the first data, the CPU may control writing the first data input from the user interface chip to a PCIE bus memory window address of the first non-volatile storage device through the PCIE link.

Step 902. Write the data to the memory of the first non-volatile storage device.

The non-volatile storage device integrates a memory, which creates conditions for changing from centralized cache management to distributed cache management. For example, if each non-volatile storage device integrates a memory, each non-volatile storage device may manage its memory separately. In this way, the CPU does not need to uniformly manage all memories, thereby implementing the changing from centralized cache management to distributed cache management.

Step 903. Read a group of data to be checked which includes the data.

In the actual application, the size of a check stripe may be determined according to the service requirement (for example, the size of one stripe is 16 KB (kilobytes), 32 KB, 64 KB, or any other size). One check stripe includes a group of data to be checked. For example, the data input from the user interface chip and other data to be checked which is stored in the non-volatile storage device (such as, for example, the first non-volatile storage device and/or other non-volatile storage devices) may be used as a group of data to be checked; or the data input from the user interface chip may be directly used as a group of data to be checked.

Step 904. Perform a check operation for the group of data to be checked to obtain redundant data.

If the storage array includes a CPU and a hardware engine, then the CPU or hardware engine may read the group of data to be checked which includes the data, and perform a check operation (for example, an XOR (exclusive-or) operation or any other check operation) for the group of data to be checked to obtain redundant data. If the storage array includes a CPU but does not include a hardware engine, the CPU may read the group of data to be checked which includes the data, and perform a check operation (for example, an XOR operation or any other check operation) for the group of data to be checked to obtain redundant data.

In one example application, the CPU or hardware engine may perform data protection for the data by using multiple optional manners according to the service requirement. For example, if Redundant Array of Independent Disks (RAID) 5 check operation is performed, a piece of redundant data (namely, single check) may be calculated; if a RAID 6 check operation is performed, two pieces of redundant data may be calculated (double check).

Step 905. Write the data written in the memory of the first non-volatile storage device to the non-volatile storage medium of the first non-volatile storage device.

In an application scenario, the non-volatile storage device may further include a controller. The controller may perform cache management for the memory of the non-volatile storage device, including: input/output aggregation (IO aggregation), data hit, data washout, and so on, where the specific cache management policy may be set according to a specific condition and is not limited herein. If the first non-volatile storage device is a storage device that is allocated with PCIE bus memory window address space, the CPU may notify the mapping between the PCIE bus memory window address and the logical storage space address of the first non-volatile storage device to the first non-volatile storage device through control signaling. If the mapping between the PCIE bus memory window address and the logical storage space address of the non-volatile storage device is a default mapping agreed upon by the CPU and the first non-volatile storage device in advance, then the CPU does not need to notify the mapping between the PCIE bus memory window address and the logical storage space address of the first non-volatile storage device to the first non-volatile storage device). The controller of the first non-volatile storage device may write the first data to the memory of the non-volatile storage device; based on the preset cache management policy (the cache management policy may include: when the remaining space of the memory of the non-volatile storage device is lower than a threshold (for example, the threshold may be 10%, 20%, 30%, or any other value), writing the data written in the memory to the non-volatile storage medium; or immediately writing the data written in the memory to the non-volatile storage medium; certainly, other cache management policies may also be included, and according to the mapping between the PCIE bus memory window address and the logical storage space address of the first non-volatile storage device and the mapping between the logical storage space address and the physical storage space address of the first non-volatile storage device, the controller may control writing the first data written in the memory of the first non-volatile storage device to the non-volatile storage medium of the first non-volatile storage device.

In addition, if the CPU performs uniform addressing for the memory space of the first non-volatile storage device, then the CPU may also control writing the first data to the memory of the non-volatile storage device, and based on the preset cache management policy, writing the first data written in the memory of the non-volatile storage device to the non-volatile storage medium of the non-volatile storage device.

In one example application, when the controller of the first non-volatile storage device writes the first data to the memory of the first non-volatile storage device, the controller may first judge whether the memory of the non-volatile storage device has cached data the same as the first data (for example, whether the memory has cached data the same as the first data may be judged according to whether the write address is the same; and if the memory has cached data (referred to as second data for ease of description) having the same write address as the first data, it may be regarded that the second data is the same as the first data); and if not, write the first data to the memory of the non-volatile storage device; or if so, use the second data as the first data written to the memory of the non-volatile storage device (that is, in this case, the controller does not control writing the first data to the memory of the non-volatile storage device, but uses the second data as the first data written to the memory of the non-volatile storage device), or write the first data to the memory of the non-volatile storage device to replace the second data.

It may be found that in the above solutions of this embodiment, the PCIE link is occupied only once in the process of writing a piece of data, and the data writing mechanism occupies fewer bus resources in the data writing process than that in the prior art (i.e., in the prior art, the data input from the user interface chip first arrives at the memory connected to the CPU, and then is moved from the memory connected to the CPU to the storage device). In addition, because the non-volatile storage device manages the data writing process in a distributed manner, the occupation of CPU resources may be reduced.

Step 906. Write the redundant data to the non-volatile storage medium of the first non-volatile storage device or second non-volatile storage device through the PCIE link.

The CPU or hardware engine in the storage array may transfer the redundant data to the first non-volatile storage device (or the second non-volatile storage device) through the PCIE link, for example, write the redundant data to a PCIE bus memory window address of the first non-volatile storage device (or the second non-volatile storage device). Similar to the manner for storing the data input from the user interface chip, the controller of the first non-volatile storage device (or the second non-volatile storage device) may write the redundant data to the memory of the first non-volatile storage device (or the second non-volatile storage device); based on the preset cache management policy (the cache management policy may include: when the remaining space of the memory of the non-volatile storage device is lower than a threshold (for example, 10%, 20%, 30%, or any other value), writing the data written in the memory to the non-volatile storage medium; or immediately writing the data written in the memory to the non-volatile storage medium; certainly, other cache management policies may also be included), and according to the mapping between the PCIE bus memory window address and the logical storage space address of the first non-volatile storage device (or the second non-volatile storage device) and the mapping between the logical storage space address and the physical storage space address of the first non-volatile storage device (or the second non-volatile storage device), the controller may control writing the redundant data written in the memory of the first non-volatile storage device (or the second non-volatile storage device) to the non-volatile storage medium of the first non-volatile storage device (or the second non-volatile storage device). In addition, if the CPU performs uniform addressing for the memory space of the first non-volatile storage device (or the second non-volatile storage device), the CPU or hardware engine may also control writing the redundant data to the memory of the first non-volatile storage device (or the second non-volatile storage device), and based on the preset cache management policy, writing the redundant data written in the memory of the first non-volatile storage device (or the second non-volatile storage device) to the non-volatile storage medium of the first non-volatile storage device (or the second non-volatile storage device).

In addition, if memory mirroring of written data is further required, then the data input by the user interface chip may also be written to the memory of a third non-volatile storage device, where the third non-volatile storage device includes a memory and a non-volatile storage medium. In some embodiments, the third non-volatile storage device serves as a backup non-volatile storage device for the first non-volatile storage device. For example, the CPU may control writing, through the PCIE link, the first data input from the user interface chip to a PCIE bus memory window address of the first non-volatile storage device and a PCIE bus memory window address of the third non-volatile storage device respectively. Similar to the manner for writing data by the controller of the first non-volatile storage device, the controller of the third non-volatile storage device may write the first data to the memory of the third non-volatile storage device; based on the preset cache management policy, and according to the mapping between the PCIE bus memory window address and the logical storage space address of the third non-volatile storage device and the mapping between the logical storage space address and the physical storage space address of the third non-volatile storage device, the controller may control writing the first data written in the memory of the third non-volatile storage device to the non-volatile storage medium of the third non-volatile storage device. In addition, if the CPU performs uniform addressing for the memory space of the third non-volatile storage device, then the CPU may also control writing the first data to the memory of the third non-volatile storage device, and based on the preset cache management policy, writing the first data written in the memory of the third non-volatile storage device to the non-volatile storage medium of the third non-volatile storage device. Considering that the first data written in the third non-volatile storage device may be deleted after check operation is performed for the first data, the third non-volatile storage device may, in some cases, temporarily not store the first data written in the memory of the third non-volatile storage device into the non-volatile storage medium of the third non-volatile storage device, but after the redundant data is written to the non-volatile storage medium of the first non-volatile storage device (or the second non-volatile storage device), the CPU may send a data deletion instruction to the third non-volatile storage device, and the third non-volatile storage device deletes, according to the data deletion instruction, the first data cached in the memory of the third non-volatile storage device, thereby not only performing memory mirroring, but also relatively decreasing the number of times of writing or erasing data for the non-volatile storage medium of the third non-volatile storage device.

In some embodiments, during the data reading/writing process of the storage device, different modules of the storage device may convert the encapsulation format of the data. For example, the user interface chip may convert the data from the user terminal in the encapsulation format into a PCIE packet, and convert the data to be sent to the user terminal into the corresponding encapsulation format; the non-volatile storage device may remove the packet header of the PCIE packet from the user interface chip or other modules and caches the PCIE packet into the memory and writes the PCIE packet to the non-volatile storage medium; the non-volatile storage device may also encapsulate the data that is read from the memory and needs to be sent to the user interface chip or other modules into a PCIE packet and send the PCIE packet. In different application scenarios, the encapsulation formats corresponding to the data are different, and details are omitted herein.

As seen from above, the non-volatile storage device configured in the storage device in this embodiment includes a memory and a non-volatile storage medium, and integrates the memory and non-volatile storage medium; the data input by the user interface chip is transferred to the non-volatile storage device directly through the PCIE link, and then is stored in the non-volatile storage medium of the non-volatile storage device, thereby implementing direct data transmission from the user interface chip to the SSD without requiring forwarding via the memory controlled by the CPU; the data reading/writing mechanism occupies fewer PCIE links than that in the prior art, and is advantageous for improving performance of the storage system. In addition, the check protection based on the above architecture for the data input by the user interface chip is advantageous for improving data security.

Further, because a memory is configured for the non-volatile storage device, if the storage device is configured with multiple non-volatile storage devices, then the number of memory channels provided by the storage device may be several times greater than the number of memory channels provided in the prior art, a larger memory interface bandwidth is provided, and the performance of the storage system is further improved. In addition, each non-volatile storage device may perform distributed memory management, which is advantageous for decreasing occupation of CPU resources.

Embodiment 4

For better understanding and implementing the technical solutions of the embodiment of the present invention, the following describes in detail an application scenario of data protection in the storage array architecture shown in FIG. 2. This embodiment is described by using an example where the non-volatile storage device included in the storage array is a solid state disk, and the workflow using other types of non-volatile storage devices is similar.

Figure 10:
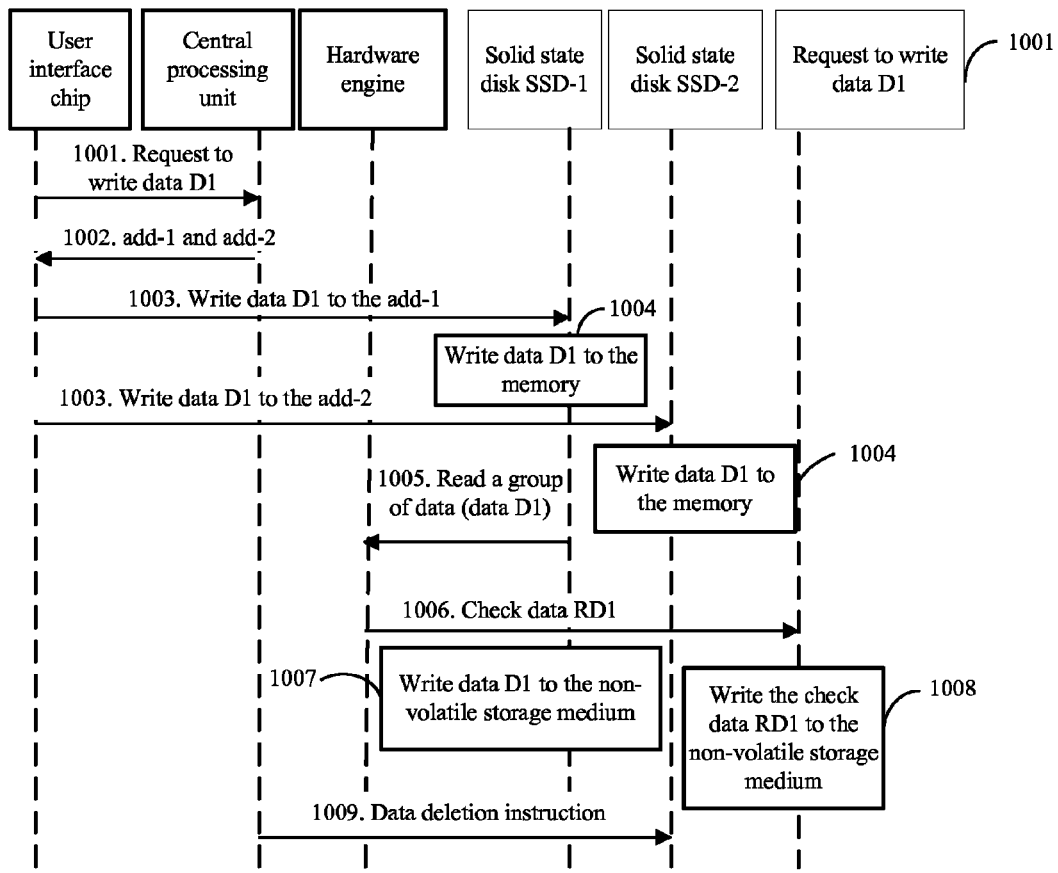
FIG. 10 is a schematic flowchart of another data protection method according to an embodiment of the present invention.
Figure 11:
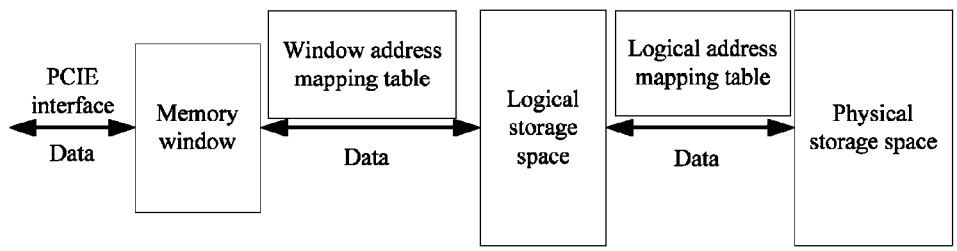
FIG. 11 is a schematic flowchart of a data writing process according to an embodiment of the present invention.

Referring to FIG. 10, an embodiment of a storage array data protection method according to the present invention may include the following:

Step 1001. A user interface chip requests a CPU through an instruction to write a piece of data (referred to as data D1 for ease of citation) from a user terminal.

Step 1002. The CPU allocates a PCIE bus memory window address (referred to as a PCIE bus memory window address add-1 for ease of citation) of a solid state disk (referred to as a solid state disk SSD-1 for ease of citation) for the user interface chip to write the data D1, and allocates a PCIE bus memory window address (referred to as a PCIE bus memory window address add-2 for ease of citation) of another solid state disk (referred to as a solid state disk SSD-2 for ease of citation) for the user interface chip to write the data D1.

For example, the storage array shown in FIG. 8-*b* may include at least one PCIE switch chip. The PCIE switch chip is configured with multiple PCIE interfaces. The CPU, the hardware engine, and the peripheral components, such as the user interface chip and solid state disk, are connected to the PCIE bus link through the PCIE switch chip.

The solid state disk in this embodiment may be configured with at least two PCIE interfaces to respectively connect to PCIE interfaces of different PCIE switch chips. Because the solid state disk is connected to the PCIE switch chips through multiple PCIE links, this can avoid the problem that the solid state disk fails to work due to single-point failure.

In one example application, when the CPU initializes the accessed solid state disks SSD-1 and SSD-2, the CPU may scan the configuration space of the solid state disks SSD-1 and SSD-2, allocate a corresponding size of PCIE bus memory window address space to the solid state disks SSD-1 and SSD-2 according to the scanned requested size of PCIE bus memory window address space recorded in the configuration space, and respectively allocate a segment of PCIE bus memory window address space to the solid state disks SSD-1 and SSD-2 (for example, the size of the memory window may be equal to the size of the memory (such as 4 GB) of the solid state disk, or the size of the logical storage space (such as 400 GB) of the solid state disk, or certainly may be any other value); when the user interface chip requests to write the data D1, the CPU may allocate the PCIE bus memory window address add-1 corresponding to the solid state disk SSD-1 and the PCIE bus memory window address add-2 corresponding to the solid state disk SSD-2 for the user interface chip to write the data D1.

Step 1003. The user interface chip writes the data D1 to the PCIE bus memory window address add-1 of the solid state disk SSD-1 and the PCIE bus memory window address add-2 of the solid state disk SSD-2 through the PCIE link.

Step 1004. The controller of the solid state disk SSD-1 writes the data D1 to the memory of the solid state disk SSD-1; and the controller of the solid state disk SSD-2 writes the data D1 to the memory of the solid state disk SSD-2.

Step 1005. The hardware engine reads a group of data to be checked which includes the data D1.

In the actual application, the size of a check stripe may be determined according to the service requirement (for example, the size of the stripe is 16 KB, 32 KB, 64 KB, or any other size). One check stripe includes a group of data to be checked. For example, the data D1 input from the user interface chip and other data stored in the non-volatile storage device (such as the first non-volatile storage device and/or other non-volatile storage devices) may be used as a group of data to be checked; or the data D1 input from the user interface chip may be directly used as a group of data to be checked.

Step 1006. The hardware engine performs a check operation for the read group of data to be checked to obtain redundant data (referred to as redundant data 1 for ease of citation), and writes the redundant data to a PCIE bus memory window address add-3 of a solid state disk SSD-3.

The hardware engine may perform a check operation for the group of data to be checked, for example, an XOR operation or any other check operation, to obtain redundant data RD1. In the actual application, the hardware engine may perform data protection for the data by using multiple optional manners according to the service requirement. For example, if RAID5 check operation is performed, a piece of redundant data (namely, single check) may be calculated; if a RAID6 check operation is performed, two pieces of redundant data may be calculated (namely, double check).

It is understandable that this embodiment uses an example where the hardware engine writes the calculated redundant data RD1 to the PCIE bus memory window address of the solid state disk SSD-3 (an SSD different from the SSD-1 and SSD-2 to implement inter-disk protection). In some embodiments, the hardware engine may also write the calculated redundant data RD1 to the PCIE bus memory window addresses of the solid state disks SSD-1 or SSD-2.

Step 1007. The controller of the solid state disk SSD-1 writes the data D1 written in the memory of the solid state disk SSD-1 to the non-volatile storage medium of the solid state disk SSD-1.

In an application scenario, the CPU may notify the mapping (a mapping exists between the PCIE bus memory window address and the logical storage space address of the corresponding solid state disk, and the mapping may be recorded by a window address mapping table) between the PCIE bus memory window address add-1 and the logical storage space address of the solid state disk SSD-1 to the solid state disk SSD-1. In some embodiments, if the mapping between the PCIE bus memory window address and the logical storage space address of the solid state disk is a default mapping agreed upon by the CPU and the solid state disk in advance, the CPU does not need to notify the mapping between the PCIE bus memory window address add-1 and the logical storage space address of the solid state disk SSD-1 to the solid state disk. The controller of the solid state disk SSD-1 may write the data D1 to the memory of the solid state disk, and control, according to the mapping between the PCIE bus memory window address add-1 and the logical storage space address of the solid state disk SSD-1 and the mapping between the logical storage space address and the physical storage space address of the solid state disk SSD-1 (the mapping between the logical storage space and the physical storage space of the solid state disk is recorded in the logical address mapping table maintained by the solid state disk), writing the data D1 written in the memory of the solid state disk SSD-1 to the non-volatile storage medium of the solid state disk SSD-1. For the writing process, reference may be made to the schematic flowchart of writing data in FIG. 10.

In one example application, the controller of the solid state disk SSD-1 may first judge whether the memory of the solid state disk SSD-1 has data the same as the data D1 (for example, whether the memory has cached data the same as the data D1 may be judged according to whether the write address is the same; and if the memory has cached data (referred to as second data for ease of description) having the same write address as the data D1, it may be regarded that the second data is the same as the data D1), and if not, write the data D1 to the memory of the solid state disk SSD-1, or if so, directly use the written data the same as the data D1 as the data D1 and write it to the non-volatile storage medium of the solid state disk SSD-1, without performing the operation of writing the data D1 to the memory and then to the non-volatile storage medium. This may also be regarded as distributed cache management performed by the solid state disk SSD-1. That is, the cache management function of the CPU is distributed to reduce the workload of the CPU.

In some embodiments, the manner for writing the data D1 to the solid state disk SSD-2 may be similar to the manner for writing the data D1 to the solid state disk SSD-1.

It may be found that in the solutions of this embodiment, writing data D1 to a solid state disk occupies the PCIE link only once; and the data writing mechanism occupies fewer bus resources in the data writing process than that in the prior art (in the prior art, the data input from the user interface chip first arrives at the memory connected to the CPU, and then is moved from the memory connected to the CPU to the storage device). In addition, because the non-volatile storage device manages the data writing process in a distributed manner, the occupation of CPU resources may be reduced.

Step 1008. The controller of the solid state disk SSD-3 writes the redundant data RD1 to the memory of the solid state disk SSD-3, and writes the data written in the memory of the solid state disk SSD-3 to the non-volatile storage medium of the solid state disk SSD-3.

Step 1009. The CPU sends a data deletion instruction to the solid state disk SSD-2.

The solid state disk SSD-2 may delete, according to the data deletion instruction, the data D1 stored in the memory of the solid state disk SSD-2. The solid state disk SSD-2 does not immediately write the data D1 to the non-volatile storage medium of the solid state disk SSD-2, which is advantageous for decreasing the number of times of writing or erasing data for the non-volatile storage medium of the solid state disk SSD-2.

In one example application, the controller of the solid state disk (such as the SSD-1, SSD-2, or SSD-3) may perform cache management for the memory of the solid state disk, for example, including: input/output aggregation (IO aggregation), data hit, data washout, and so on, where the specific cache management policy may be set according to a specific condition and is not limited herein.

For example, if the memory of the solid state disk SSD-1 has sufficient remaining space, the controller of the solid state disk SSD-1 may write the data D1 to the memory of the solid state disk SSD-1. If the memory is insufficient, the controller of the solid state disk SSD-1 may first wash out unnecessary data in the memory (for example, the unnecessary data may be the data that is not accessed for a long time), and then write the data D1 to the memory of the solid state disk SSD-1, which may also be regarded as distributed cache management performed by the solid state disk SSD-1. That is, the cache management function of the CPU is distributed to reduce the workload of the CPU.

Further, if it is further required to read the data D1 from the solid state disk SSD-1 subsequently, the controller of the solid state disk SSD-1 may read the data D1 stored in the non-volatile storage medium of the solid state disk SSD-1 to the memory of the solid state disk SSD-1; and transfer, through the PCIE link, the data D1 read from the memory of the solid state disk SSD-1 to the user interface chip (if the user interface chip requests to read the data D1); or transfer, through the PCIE link, the data D1 read from the memory of the solid state disk to the CPU or hardware engine for processing (if the CPU or hardware engine needs to process the data D1).

As seen from the above, the solid state disk configured in the storage device in this embodiment includes a memory and a non-volatile storage medium, and integrates the memory and non-volatile storage medium (including: a flash memory, a ferroelectric storage medium, or any other storage medium); the data input by the user interface chip is transferred to the solid state disk directly through the PCIE link, and then is stored in the non-volatile storage medium of the solid state disk, thereby implementing direct data transmission from the user interface chip to the SSD without requiring forwarding via the memory controlled by the CPU; the data access mechanism occupies fewer PCIE links than that in the prior art, and is advantageous for improving performance of the storage system. In addition, the check operation based on the above architecture for the data input by the user interface chip is advantageous for improving data security.

Further, because a memory is configured for the solid state disk, if the storage device is configured with multiple solid state disks, then the number of memory channels provided by the storage device may be several times greater than the number of memory channels provided in the prior art, a larger memory interface bandwidth is provided, and the performance of the storage system is further improved.

Part or all of cache management functions (including: data reading/writing control, IO aggregation, data hit, data washout, and so on) change from centralized management of the CPU to distributed management of each solid state disk, which may relatively reduce the processing load of the CPU and further improve the performance of the storage system. In addition, the storage array using the architecture of this embodiment is advantageous for reducing the volume and power consumption of the storage array.

To better implement the technical solutions of the above embodiment, an embodiment of the present invention provides a device for implementing the above technical solutions.

Embodiment 6

Referring to FIG. 12-*a*, a storage array 1200 provided in an embodiment of the present invention may include: a central processing unit 1210, a user interface chip 1220, a PCIE switch chip 1230, and a first non-volatile storage device 1240.

The PCIE switch chip 1230 connects the central processing unit 1210, user interface chip 1220, and first non-volatile storage device 1240 to a PCIE link, where the first non-volatile storage device 1240 includes a memory and a non-volatile storage medium.

The central processing unit 1210 is adapted to control transferring data input from the user interface chip 1220 to the first non-volatile storage device 1240 through the PCIE link.

The first non-volatile storage device 1240 is adapted to write the data to the memory of the first non-volatile storage device 1240, and write the data written in the memory of the first non-volatile storage device 1240 to the non-volatile storage medium of the first non-volatile storage device 1240.

The central processing unit 1210 is further adapted to read a group of data to be checked which includes the data; perform a check operation for the group of data to be checked to obtain redundant data; and control transferring the redundant data to the first non-volatile storage device 1240 through the PCIE link.

Referring to FIG. 12-*b*, the storage array 1200 may further include: a second non-volatile storage device 1250, where the second non-volatile storage device 1250 includes a memory and a non-volatile storage medium.

The central processing unit 1210 may also be further adapted to read a group of data to be checked which includes the data; perform a check operation for the group of data to be checked to obtain redundant data; and control transferring the redundant data to the second non-volatile storage device 1250 through the PCIE link.

Referring to FIG. 12-*c*, in an application scenario, the storage array 1200 may further include: a third non-volatile storage device 1260, where the third non-volatile storage device 1260 includes a memory and a non-volatile storage medium.

The central processing unit 1210 is further adapted to write the data to the memory of the third non-volatile storage device 1260.

In some embodiments, the storage array 1200 may be the storage array in the foregoing method embodiments. The functions of the storage array may be implemented according to the method provided in the foregoing method embodiments. The specific implementation process is as disclosed in the related description of the foregoing method embodiments, and is not further described herein.

Embodiment 7

Referring to FIG. 13-a, a storage array 1300 provided in an embodiment of the present invention may include: a central processing unit 1310, a hardware engine 1320, a user interface chip 1330, a PCIE switch chip 1340, and a first volatile storage device 1350.

The PCIE switch chip 1340 connects the central processing unit 1310, hardware engine 1320, user interface chip 1330, and first non-volatile storage device 1350 to a PCIE link, where the first non-volatile storage device 1350 includes a memory and a non-volatile storage medium.

The memory of the first non-volatile storage device 1350 may be: a high-performance volatile storage medium such as a DDR synchronous dynamic random access memory, a DDRII synchronous dynamic random access memory, or a DDRIII synchronous dynamic random access memory, or may also be a virtual memory. The non-volatile storage medium of the first non-volatile storage device 1350 may include: a flash memory (flash), a ferroelectric storage medium, or any other storage medium.

The central processing unit 1310 is adapted to control transferring data input from the user interface chip 1330 to the first non-volatile storage device 1350 through the PCIE link.

The first non-volatile storage device 1350 is adapted to write the data to the memory of the first non-volatile storage device 1350, and write the data written in the memory of the first non-volatile storage device 1350 to the non-volatile storage medium of the first non-volatile storage device 1350.

In one example application, if the user interface chip 1330 can directly access a block (Block) device, then the CPU may control writing the first data input from the user interface chip to a logical storage address (LBA) of the first non-volatile storage device 1350 through the PCIE link. If the user interface chip 1330 cannot directly access the Block device but can access a memory device, when the CPU 1310 initializes the accessed first non-volatile storage device 1350, the CPU 1310 may allocate a segment of memory window address space to the first non-volatile storage device 1350 (for example, the size of the memory window address space may be equal to the size of the memory (such as 4 GB) of the first non-volatile storage device 1350, or the size of the logical storage space (such as 400 GB) of the first non-volatile storage device 1350, or certainly may be any other value); when the user interface chip 1330 inputs the first data, the CPU may control writing the first data input from the user interface chip to a PCIE bus memory window address of the first non-volatile storage device 1350 through the PCIE link.

In one example application scenario, the first non-volatile storage device 1350 may further include a controller. The controller may perform cache management for the memory of the non-volatile storage device, including: input/output aggregation (IO aggregation), data hit, data washout, and so on, where the specific cache management policy may be set according to a specific condition and is not limited herein. If the first non-volatile storage device 1350 is a storage device that is allocated with PCIE bus memory window address space, then the CPU 1310 may notify the mapping between the PCIE bus memory window address and the logical storage space address of the first non-volatile storage device 1350 to the first non-volatile storage device 1350 through control signaling (if the mapping between the PCIE bus memory window address and the logical storage space address of the non-volatile storage device is a default mapping agreed upon by the CPU 1310 and the first non-volatile storage device 1350 in advance, the CPU 1310 may not notify the mapping between the PCIE bus memory window address and the logical storage space address of the first non-volatile storage device 1350 to the first non-volatile storage device 1350). The controller of the first non-volatile storage device 1350 may write the first data to the memory of the non-volatile storage device; based on the preset cache management policy (the cache management policy may include: when the remaining space of the memory of the non-volatile storage device is lower than a threshold (for example, the threshold may be 10%, 20%, 30%, or any other value), writing the data written in the memory to the non-volatile storage medium; or immediately writing the data written in the memory to the non-volatile storage medium; certainly, other cache management policies may also be included), and according to the mapping between the PCIE bus memory window address and the logical storage space address of the first non-volatile storage device 1350 and the mapping between the logical storage space address and the physical storage space address of the first non-volatile storage device 1350, the controller may control writing the first data written in the memory of the first non-volatile storage device 1350 to the non-volatile storage medium of the first non-volatile storage device 1350.

In addition, if the CPU 1310 performs uniform addressing for the memory space of the first non-volatile storage device 1350, the CPU 1310 may also control writing the first data to the memory of the first non-volatile storage device 1350, and based on the preset cache management policy, writing the first data written in the memory of the first non-volatile storage device 1350 to the non-volatile storage medium of the first non-volatile storage device 1350.

In one example application, when the controller of the first non-volatile storage device 1350 writes the first data to the memory of the first non-volatile storage device 1350, the controller may first judge whether the memory of the non-volatile storage device has cached data the same as the first data (for example, whether the memory has cached data the same as the first data may be judged according to whether the write address is the same; and if the memory has cached data (referred to as second data for ease of description) having the same write address as the first data, it may be regarded that the second data is the same as the first data); and if not, write the first data to the memory of the non-volatile storage device; or if so, use the second data as the first data written to the memory of the first non-volatile storage device 1350 (that is, in this case, the controller does not control writing the first data to the memory of the non-volatile storage device, but uses the second data as the first data written to the memory of the non-volatile storage device), or write the first data to the memory of the non-volatile storage device 1350 to replace the second data.

The hardware engine 1320 is adapted to read a group of data to be checked which includes the data; perform a check operation for the group of data to be checked, for example, an XOR operation or any other check operation, to obtain redundant data; and control transferring the redundant data to the first non-volatile storage device 1350 through the PCIE link.

In one example application, the size of a check stripe may be determined according to the service requirement (for example, the size of the stripe is 16 KB, 32 KB, 64 KB, or any other size). One check stripe includes a group of data to be checked. For example, the hardware engine 1320 may use the data input from the user interface chip and other data stored in the non-volatile storage device (such as the first non-volatile storage device 1350 and/or other non-volatile storage devices) as a group of data to be checked; or the hardware engine 1320 may also directly use the data input from the user interface chip as a group of data to be checked.

If the storage array includes a CPU and a hardware engine, the CPU or hardware engine may read the group of data to be checked which includes the data, and perform a check operation (for example, an XOR operation or any other check operation) for the group of data to be checked to obtain redundant data. If the storage array includes a CPU but does not include a hardware engine, the CPU may read the group of data to be checked which includes the data, and perform a check operation (for example, an XOR operation or any other check operation) for the group of data to be checked to obtain redundant data.

Referring to FIG. 13-*b*, the storage array 1300 may further include: a second non-volatile storage device 1360, where the second non-volatile storage device 1360 includes a memory and a non-volatile storage medium. The memory of the second non-volatile storage device 1360 may be: a high-performance volatile storage medium such as a DDR synchronous dynamic random access memory, a DDRII synchronous dynamic random access memory, or a DDRIII synchronous dynamic random access memory, or may also be a virtual memory. The non-volatile storage medium of the second non-volatile storage device 1360 may include: a flash memory (flash), a ferroelectric storage medium, or any other storage medium.

The hardware engine 1320 may also be adapted to read a group of data to be checked which includes the data; perform a check operation for the group of data to be checked to obtain redundant data; and control transferring the redundant data to the second non-volatile storage device 1360 through the PCIE link.

It is understandable that the storage array 1300 in this embodiment may be the storage array in the foregoing method embodiments. The functions of the storage array may be implemented according to the method provided in the foregoing method embodiments. The specific implementation process is as disclosed in the related description of the foregoing method embodiments, and is not further described herein.

Embodiment 8

Figure 14:
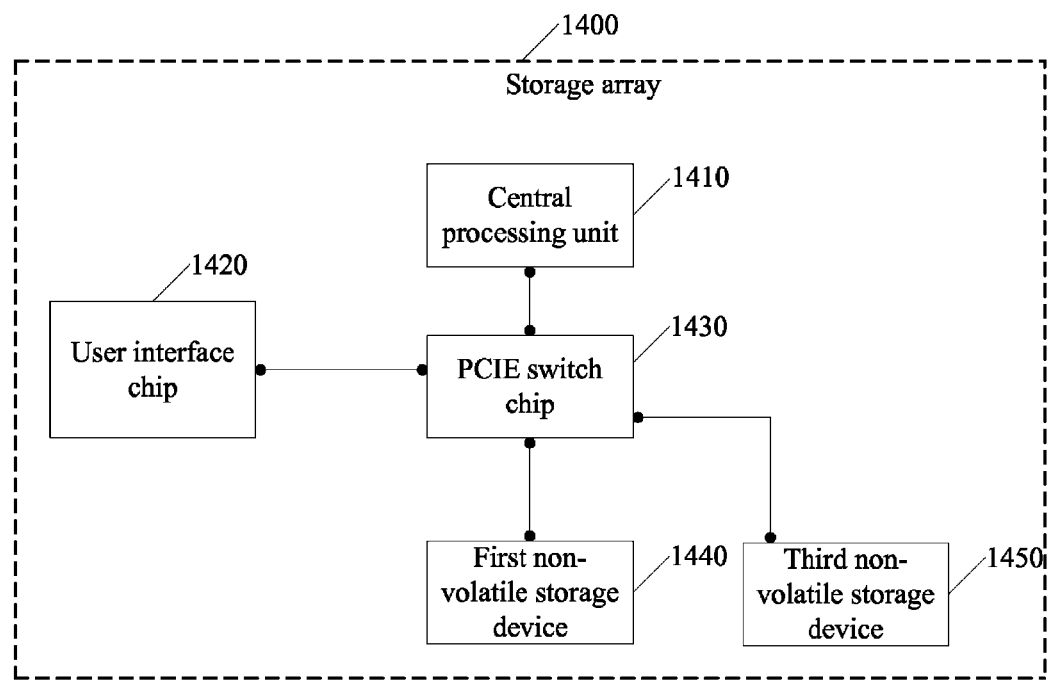
FIG. 14 is a schematic diagram of a storage array according to an embodiment of the present invention.

Referring to FIG. 14, a storage array 1400 provided in an embodiment of the present invention may include: a central processing unit 1410, a user interface chip 1420, a PCIE switch chip 1430, a first volatile storage device 1440, and a third non-volatile storage device 1450.

The PCIE switch chip 1430 connects the central processing unit 1410, user interface chip 1420, first non-volatile storage device 1440, and third non-volatile storage device 1450 to a PCIE link.

The first non-volatile storage device 1440 and the third non-volatile storage device 1450 include a memory and a non-volatile storage medium respectively, where the memory of the first non-volatile storage device 1440 and the third non-volatile storage device 1450 may be: high-performance volatile storage media such as DDR synchronous dynamic random access memories, DDRII synchronous dynamic random access memories, or DDRIII synchronous dynamic random access memories, or may also be virtual memories. The non-volatile storage medium of the first non-volatile storage device 1440 and the third non-volatile storage device 1450 may include: flash memories (flash), a ferroelectric storage media, or any other storage media.

The central processing unit 1410 is adapted to control transferring data input from the user interface chip 1420 respectively to the first non-volatile storage device 1440 and the third non-volatile storage device 1450 through the PCIE link.

The first non-volatile storage device 1440 is adapted to write the data to the memory of the first non-volatile storage device 1440, and write the data written in the memory of the first non-volatile storage device 1440 to the non-volatile storage medium of the first non-volatile storage device 1440.

In one example application scenario, the first non-volatile storage device 1440 may further include a controller. The controller may perform cache management for the memory of the non-volatile storage device, including: input/output aggregation (IO aggregation), data hit, data washout, and so on, where the specific cache management policy may be set according to a specific condition and is not limited herein. If the first non-volatile storage device 1440 is a storage device that is allocated with PCIE bus memory window address space, then the CPU 1410 may notify the mapping between the PCIE bus memory window address and the logical storage space address of the first non-volatile storage device 1440 to the first non-volatile storage device 1440 through control signaling (if the mapping between the PCIE bus memory window address and the logical storage space address of the non-volatile storage device is a default mapping agreed upon by the CPU 1410 and the first non-volatile storage device 1440 in advance, the CPU 1410 may not notify the mapping between the PCIE bus memory window address and the logical storage space address of the first non-volatile storage device 1440 to the first non-volatile storage device 1440). The controller of the first non-volatile storage device 1440 may write the first data to the memory of the non-volatile storage device; based on the preset cache management policy (the cache management policy may include: when the remaining space of the memory of the non-volatile storage device is lower than a threshold (for example, the threshold may be 10%, 20%, 30%, or any other value), write the data written in the memory to the non-volatile storage medium; or immediately write the data written in the memory to the non-volatile storage medium; certainly, other cache management policies may also be included), and according to the mapping between the PCIE bus memory window address and the logical storage space address of the first non-volatile storage device 1440 and the mapping between the logical storage space address and the physical storage space address of the first non-volatile storage device 1440, the controller may control writing the first data written in the memory of the first non-volatile storage device 1440 to the non-volatile storage medium of the first non-volatile storage device 1440.

In addition, if the CPU 1310 performs uniform addressing for the memory space of the first non-volatile storage device 1440, the CPU 1310 may also control writing the first data to the memory of the first non-volatile storage device 1440, and based on the preset cache management policy, writing the first data written in the memory of the first non-volatile storage device 1440 to the non-volatile storage medium of the first non-volatile storage device 1440.

In one example application, when the controller of the first non-volatile storage device 1440 writes the first data to the memory of the first non-volatile storage device 1440, the controller may first judge whether the memory of the non-volatile storage device has cached data the same as the first data (usually, whether the memory has cached data the same as the first data may be judged according to whether the write addresses are the same; and if the memory has cached data (referred to as second data for ease of description) having the same write address as the first data, it may be regarded that the second data is the same as the first data); and if not, write the first data to the memory of the non-volatile storage device; or if so, use the second data as the first data written to the memory of the first non-volatile storage device 1440 (that is, in this case, the controller does not control writing the first data to the memory of the non-volatile storage device, but uses the second data as the first data written to the memory of the non-volatile storage device), or write the first data to the memory of the first non-volatile storage device 1440 to replace the second data.

The third non-volatile storage device 1450 is adapted to write the data to the memory of the third non-volatile storage device 1450.

In some embodiments, the third non-volatile storage device 1450 serves as a backup non-volatile storage device for the first non-volatile storage device 1440. For example, the CPU 1410 may control writing, through the PCIE link, the first data input from the user interface chip to a PCIE bus memory window address of the first non-volatile storage device 1440 and a PCIE bus memory window address of the third non-volatile storage device 1450 respectively. Similar to the manner for writing data by the controller of the first non-volatile storage device 1440, the controller of the third non-volatile storage device 1450 may write the first data to the memory of the non-volatile storage device; based on the preset cache management policy, and according to the mapping between the PCIE bus memory window address and the logical storage space address of the third non-volatile storage device 1450 and the mapping between the logical storage space address and the physical storage space address of the third non-volatile storage device 1450, the controller may control writing the first data written in the memory of the third non-volatile storage device 1450 to the non-volatile storage medium of the third non-volatile storage device 1450. In addition, if the CPU 1410 performs uniform addressing for the memory space of the third non-volatile storage device, the CPU 1410 may also control writing the first data to the memory of the third non-volatile storage device 1450, and based on the preset cache management policy, writing the first data written in the memory of the third non-volatile storage device 1450 to the non-volatile storage medium of the third non-volatile storage device 1450. Particularly, considering that the first data written in the third non-volatile storage device 1450 may be deleted after check operation is performed for the first data, the third non-volatile storage device 1450 may temporarily not store the first data written in the memory of the third non-volatile storage device 1450 into the non-volatile storage medium of the third non-volatile storage device 1450, but after the redundant data is written to the non-volatile storage medium of the first non-volatile storage device 1440 (or the second non-volatile storage device), the CPU 1410 may send a data deletion instruction to the third non-volatile storage device 1450, and the third non-volatile storage device 1450 deletes, according to the data deletion instruction, the first data cached in the memory of the third non-volatile storage device 1450, thereby not only performing memory mirroring, but also relatively decreasing the number of times of writing or erasing data for the non-volatile storage medium of the third non-volatile storage device 1450.

In some embodiments, the storage array 1400 may be the storage array in the foregoing method embodiments. The functions of the storage array may be implemented according to the method provided in the foregoing method embodiments. The specific implementation process is as disclosed in the related description of the foregoing method embodiments, and is not further described herein.

Embodiment 9

Figure 15:
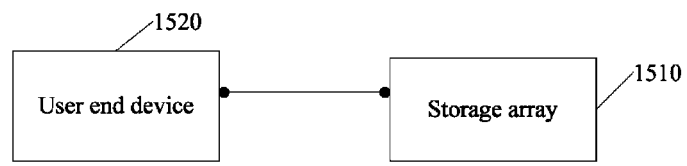
FIG. 15 is a schematic diagram of a storage system according to an embodiment of the present invention.

Referring to FIG. 15, an embodiment of the present invention also provides a storage system, including: a storage array 1510, and a user terminal 1520 connected to a user interface chip of the storage array 1510.

The user terminal 1520 may be adapted to access the storage array 1510 through the user interface chip of the storage array, for example, the user terminal 1520 may write data to the storage array 1510, and/or, read data from the storage array 1510.

For example, the storage array 1510 may be a storage array 600, a storage array 700, or a storage array 800.

For the foregoing method embodiments, for ease of description, the method is described through a series of step combinations. However, it should be understood by persons skilled in the art that, embodiments of the present invention are not limited by the sequence of the described steps, and some steps may be performed in other sequences or performed at the same time according to embodiments of the present invention. It should be further understood by persons skilled in the art that the described embodiments are exemplary embodiments, and the involved actions and modules are not necessarily required by embodiments of the present invention.

In the above embodiments, the description of each embodiment has its emphasis, and some embodiments may not be detailed. Reference may be made to the relevant description of other embodiments.

To conclude, the non-volatile storage device configured in the storage device in the embodiments of the present invention includes a memory and a non-volatile storage medium, and integrates the memory and non-volatile storage medium; the data input by the user interface chip is transferred to the non-volatile storage device directly through the PCIE link, and then is stored in the non-volatile storage medium of the non-volatile storage device; the data writing mechanism occupies fewer PCIE links than that in the prior art (in the prior art, the data input from the user interface chip first arrives at the memory connected to the CPU, and then the CPU controls removing the data from the memory connected to the CPU to the storage device) and is advantageous for improving performance of the storage system. In addition, the check operation based on the above architecture for the data input by the user interface chip is advantageous for improving data security.

Further, because a memory is configured for the non-volatile storage device, if the storage device is configured with multiple non-volatile storage devices, then the number of memory channels provided by the storage device may be several times greater than the number of memory channels provided in the prior art, a larger memory interface bandwidth is provided, and the performance of the storage system is further improved.

Part or all of cache management functions (such as, for example, data reading/writing control, IO aggregation, data hit, and data washout) change from centralized management of the CPU to distributed management of each non-volatile storage device, which may relatively reduce the processing load of the CPU and further improve the performance of the storage system. In addition, the storage array using the architecture is advantageous for reducing the volume and power consumption of the storage array.

Persons of ordinary skill in the art should understand that all or a part of the steps of the method according to the embodiments of the present invention may be implemented by a program instructing relevant hardware. The program may be stored in a computer-readable storage medium, such as a read-only memory, a random access memory, a magnetic disk or an optical disk.

Detailed above are the storage array, the storage system, and the data access method according to the embodiments of the present invention. Some exemplary embodiments are provided for describing the principle and implementation of embodiments of the present invention; however, the embodiments are only intended to help understand the method and core idea of the embodiments of the present invention. It is apparent that persons of ordinary skill in the art can make modifications to both the specific implementation manner and application scope according to the idea of the embodiments of the present invention. Therefore, the content of the specification shall not be construed as a limitation to the embodiments of the present invention.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for a storage device to store data, wherein the storage device includes: a central processing unit (CPU), a user interface chip, a non-volatile storage device, and a peripheral component interconnect express (PCIE) link, wherein the PCIE link interconnects the CPU, the user interface chip, and the non-volatile storage device, and wherein the non-volatile storage device includes a controller, a memory, and a non-volatile storage medium, the method comprising:
receiving, by the user interface chip, the data to be stored;
sending, by the CPU to the user interface chip, a PCIE bus memory window address, wherein the non-volatile storage device is a storage device that is allocated PCIE bus memory window address space;
sending, by the CPU to the non-volatile storage device, a first mapping between the PCIE bus memory window address and a logical storage space address of the non-volatile storage device;
writing, by the user interface chip, the data to the memory according to the PCIE bus memory window address; and
writing, by the controller, the data from the memory to the non-volatile storage medium according to the first mapping between the PCIE bus memory window address and the logical storage space address of the non-volatile storage device.

2. The method according to claim 1,
wherein the step of writing by the controller the data from the memory to the non-volatile storage medium according to the first mapping comprises:
writing, by the controller, the data from the memory to the non-volatile storage medium according to the first mapping and a second mapping between the logical storage space address and a physical storage space address of the non-volatile storage device.

3. The method according to claim 1, further comprising:
reading the data stored in the non-volatile storage medium to the memory; and
transferring, through the PCIE link, the data read from the memory to the user interface chip, or transferring, through the PCIE link, the data read from the memory to the CPU for processing.

4. The method according to claim 1, the step of writing, by the user interface chip, the data to the memory according to the PCIE bus memory window address comprises:
determining, by the user interface chip, that the data is not the same as other data cached in the memory; and
based upon the determination, writing by the user interface chip the data to the memory according to the PCIE bus memory window address.

5. A storage array, comprising:
a central processing unit (CPU);
a user interface chip;
a non-volatile storage device, which includes a controller, a memory, and a non-volatile storage medium; and
peripheral component interconnect express (PCIE) link, wherein the PCIE link interconnects the CPU, the user interface chip, and the non-volatile storage device;
wherein the user interface chip is configured to receive data to be stored;
wherein the CPU is configured to send a PCIE bus memory window address to the user interface chip and send a first mapping between the PCIE bus memory window address and a logical storage space address of the non-volatile storage device to the user interface chip to the non-volatile storage device, wherein the non-volatile storage device is a storage device that is allocated PCIE bus memory window address space;
wherein the user interface chip is further configured to write the data to the memory according to the PCIE bus memory window address; and
wherein the controller is configured to write the data from the memory to the non-volatile storage medium according to the first mapping between the PCIE bus memory window address and the logical storage space address of the non-volatile storage device.

6. The storage array according to claim 5,
wherein the non-volatile storage device further comprises a controller, wherein the controller is configured to write the data from the memory to the non-volatile storage medium according to the first mapping and a second mapping between the logical storage space address and a physical storage space address of the non-volatile storage device.

7. The storage array according to claim 6, wherein the controller is further configured to:
   read the data stored in the non-volatile storage medium to the memory; and
   transfer, through the PCIE link, the data read from the memory to the user interface chip, or transfer, through the PCIE link, the data read from the memory to the CPU for processing.

8. A data protection method applicable to a storage device, wherein the storage device include: a central processing unit (CPU), a user interface chip, a plurality of non-volatile storage devices, and a peripheral component interconnect express (PCIE) link, wherein the PCIE link interconnects the CPU, the user interface chip, and the plurality of non-volatile storage devices, and wherein each of the plurality of non-volatile storage devices includes a controller, a memory, and a non-volatile storage medium, the method comprising:
   receiving, by the user interface chip, the data to be stored;
   sending, by the CPU to the user interface chip, a PCIE bus memory window address, wherein a first non-volatile storage device is a storage device that is allocated PCIE bus memory window address space;
   sending, by the CPU to the first non-volatile storage device, a first mapping between the PCIE bus memory window address and a logical storage space address of the first non-volatile storage device;
   writing, by the user interface chip, the data to the memory of the first non-volatile storage device according to the PCIE bus memory window address;
   reading a group of data to be checked from the memory of the first non-volatile storage device;
   performing a check operation for the group of data to be checked to obtain check data;
   writing the data from the memory of the first non-volatile storage device to a non-volatile storage medium of the first non-volatile storage device according to the first mapping between the PCIE bus memory window address and the logical storage space address of the first non-volatile storage device; and
   writing the check data to the non-volatile storage medium of the first non-volatile storage device or to a non-volatile storage medium of a second non-volatile storage device through the PCIE link.

9. The method according to claim 8, further comprising:
   writing the check data to a memory of a third non-volatile storage devices; and
   after the step of writing the check data to the non-volatile storage medium of the first non-volatile storage device or the non-volatile storage medium of the second non-volatile storage device, the method further comprising:
   sending, by the CPU, a data deletion instruction to the third non-volatile storage device; and
   deleting, by a controller of the third non-volatile storage device according to the data deletion instruction, the check data stored in the memory of the third non-volatile storage device.

* * * * *

UNITED STATES PATENT AND TRADEMARK OFFICE
CERTIFICATE OF CORRECTION

| | | |
|---|---|---|
| PATENT NO. | : 8,719,490 B2 | Page 1 of 1 |
| APPLICATION NO. | : 13/715409 | |
| DATED | : May 6, 2014 | |
| INVENTOR(S) | : Yang et al. | |

It is certified that error appears in the above-identified patent and that said Letters Patent is hereby corrected as shown below:

*On the Title page, Item (71), Applicant's City of Residence "Guangdong (CN)" should read --Shenzhen (CN)--.*

Signed and Sealed this
Sixteenth Day of September, 2014

Michelle K. Lee
*Deputy Director of the United States Patent and Trademark Office*